(12) United States Patent
Newby et al.

(10) Patent No.: US 11,008,061 B2
(45) Date of Patent: May 18, 2021

(54) TRI-MODE COLLAPSIBLE SCOOTER

(71) Applicant: Trio Motors, Inc., Palo Alto, CA (US)

(72) Inventors: Paul M. Newby, Palo Alto, CA (US);
S. K. Kershner, Palo Alto, CA (US)

(73) Assignee: Trio Motors, Inc., Palo Alto, CA (US)

( * ) Notice: Subject to any disclaimer, the term of this patent is extended or adjusted under 35 U.S.C. 154(b) by 107 days.

(21) Appl. No.: 16/535,004

(22) Filed: Aug. 7, 2019

(65) Prior Publication Data
US 2020/0047840 A1 Feb. 13, 2020

Related U.S. Application Data

(60) Provisional application No. 62/715,738, filed on Aug. 7, 2018.

(51) Int. Cl.
*B62K 15/00* (2006.01)
*B62K 5/027* (2013.01)

(52) U.S. Cl.
CPC .......... *B62K 15/008* (2013.01); *B62K 5/027* (2013.01); *B62K 2202/00* (2013.01)

(58) Field of Classification Search
CPC .. B62K 15/008; B62K 5/027; B62K 2202/00; B62K 23/02; B62K 21/12; B62K 13/00; B62K 15/00; B62K 3/002; B62J 99/00; B62J 7/06
See application file for complete search history.

(56) References Cited

U.S. PATENT DOCUMENTS

| 4,861,054 A * | 8/1989 | Spital .................. A63C 17/015 |
| | | 280/221 |
| 5,040,812 A | 8/1991 | Patin |
| 9,073,594 B2 | 7/2015 | Sluijter et al. |
| 2002/0121155 A1 | 9/2002 | Wu |
| 2003/0001351 A1* | 1/2003 | Schauble ............... B62K 3/002 |
| | | 280/87.05 |
| 2012/0018968 A1 | 1/2012 | Joslin et al. |
| 2013/0062377 A1 | 3/2013 | Turner et al. |
| 2013/0257003 A1* | 10/2013 | Chen ........................ B62L 1/04 |
| | | 280/87.041 |
| 2015/0035257 A1* | 2/2015 | Zaid ...................... B62K 3/002 |
| | | 280/641 |

(Continued)

FOREIGN PATENT DOCUMENTS

WO 2017123158 A3 10/2017

*Primary Examiner* — Darlene P Condra
(74) *Attorney, Agent, or Firm* — Run8 Patent Group, LLC; Peter Miller

(57) ABSTRACT

A tri-mode collapsible scooter includes: a deck; a stem; handlebars; a head tube; a neck hinge; a deck hinge; a wheelset; a neck control; and a deck control. The deck includes: a front deck section; a rear deck section; and a deck hinge interposed between the front deck section and the rear deck section. The neck control is configured to release the neck hinge for transition between an open neck position and a closed neck position. The deck control is configured to release the deck hinge for transition of the deck between an open deck position and a closed deck position. The deck hinge occupies the open deck position and the neck hinge occupies the open neck position in a ride mode; and the deck hinge occupies the closed deck position and the neck hinge occupies the closed neck position in a tow mode.

16 Claims, 10 Drawing Sheets

(56) References Cited

U.S. PATENT DOCUMENTS

| | | | |
|---|---|---|---|
| 2015/0042053 A1* | 2/2015 | Berndorfer | B62K 15/008 |
| | | | 280/7.1 |
| 2016/0107716 A1 | 4/2016 | Berndorfer et al. | |
| 2017/0066496 A1 | 3/2017 | Ochner et al. | |
| 2017/0247075 A1 | 8/2017 | Kano | |
| 2018/0170473 A1 | 6/2018 | Koo et al. | |

* cited by examiner

TRI-MODE COLLAPSIBLE SCOOTER

CROSS-REFERENCE TO RELATED APPLICATIONS

This application claims the benefit of U.S. Provisional Application No. 62/715,738, filed on 7 Aug. 2018, which is incorporated in its entirety by this reference.

TECHNICAL FIELD

This invention relates generally to the field of personal mobility and more specifically to a new and useful tri-mode collapsible scooter in the field of personal scooters.

DESCRIPTION OF THE EMBODIMENTS

Figure 1:
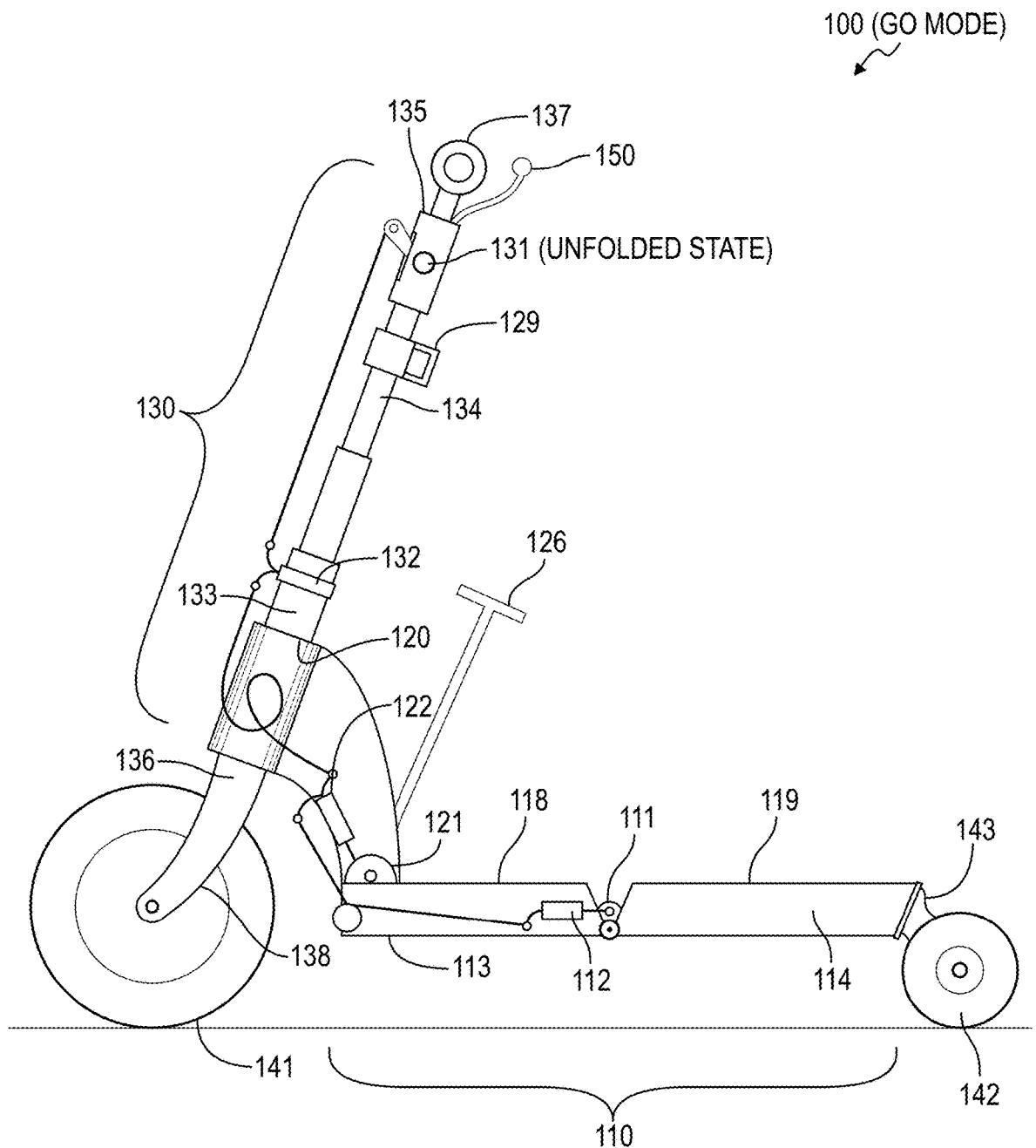
FIG. 1 is a schematic representation of a scooter.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Scooter

As shown in FIGS. 1-10B, a tri-mode collapsible scooter 100 includes: a deck 110; a stem 130; a set of handlebars 131; a neck 120; a neck hinge 121; a deck hinge 111; a front wheelset 141; a rear wheelset 142; a neck control 151; and a deck control 152. The deck 110 includes: a front deck section 113 defining a front deck surface 118; a rear deck section 114 defining a rear deck surface 119; and a deck hinge 111 interposed between the front deck section 113 and the rear deck section 114. The 121 is coupled to the front deck section 113 opposite the deck hinge 111. The neck 120 is coupled to the neck hinge 121 opposite the front deck section 113. The stem 130 is rotatably coupled to the neck 120. The set of handlebars 131 is coupled to a first end 135 of the stem 130. The front wheelset 141 is coupled to a second end 136 of the stem 130 opposite the set of handlebars 131. The rear wheelset 142 is coupled to the rear deck section 114 opposite the deck hinge 111. The neck control 151 is configured to release the neck hinge 121 for transition between an open neck position and a closed neck position. The deck control 152 is configured to release the deck hinge 111 for transition of the deck 110 between an open deck position and a closed deck position. The deck hinge 111 occupies the open deck position and the neck hinge 121 occupies the open neck position in a first mode (or a "go mode" or "ride mode") of the scooter for riding by a user; and the deck hinge 111 occupies the closed deck position and the neck hinge 121 occupies the closed neck position in a second mode (or a "tow mode") of the scooter for towing by the user.

One variation of the tri-mode collapsible scooter 100 includes: a front deck section 113 defining a substantially flat front deck surface 118 configured to carry a rider; a rear deck section 114 defining a substantially flat rear deck surface 119 configured to carry the rider; a deck hinge 111 interposed between the front deck section 113 and the rear deck section 114 and configured to transiently engage a ride deck stop 115 and a tow deck stop 116; a neck hinge 121 coupled to the front deck section 113 opposite the deck hinge 111 and configured to transiently engage a ride neck stop 124 and a tow neck stop 125; a neck coupled to the neck hinge 121 opposite the front deck section 113; a rear wheel coupled to the rear deck section 114 opposite the deck hinge 111; a front wheelset coupled to the stem 130 opposite the set of handlebars 131; and a stem 130 pivotably coupled to the neck 120. The stem 130 includes: the set of handlebars 131 at a first end 135; a first stem section 133 coupled to the front wheelset 141 and pivotably coupled to the neck hinge 121; a second stem section 134 coupled to the set of handlebars 131 and configured to locate the set of handlebars 131 at a first distance from the front wheelset 141 in an extended stem position and to locate the set of handlebars 131 at a second distance from the front wheelset 141 in a retracted stem position, the second distance less than the first distance; and a stem latch 132 configured to transiently retain the second stem section 134 in the extended stem position and the retracted stem position relative to the first stem section 133. The scooter also includes a latch release system 150 configured to selectively release the neck latch 122, the deck latch 112, and the stem latch 132.

Another variation of the tri-mode collapsible scooter 100 includes: a rear truck 143 including a rear wheelset 142; a stem 130 including a front wheelset 141 arranged on a first end 135 and a handlebar arranged proximal a second end 136 opposite the first end 135; a deck 110; and a neck 120 coupled to the front deck section 113 opposite the rear deck section 114 and pivotably coupled to and retaining the stem 130 above the front wheelset 141. The deck 110 includes: a front deck section 113; a rear deck section 114 supporting the rear truck 143 opposite the front deck section 113; a deck hinge 111 interposed between the front deck section 113 and the rear deck section 114, operable in an open deck position to locate the front deck section 113 tangent to the rear deck section 114 to form a substantially continuous deck surface, and operable in a closed deck position to separate the front deck section 113 from the second deck section with the deck hinge 111 located above the rear truck 143; and a deck latch 112 configured to selectively lock the deck hinge 111 in the closed deck position. The neck 120 includes: a neck hinge 121 operable in an open neck position with the stem 130 angularly offset from the front deck section 113 to separate the stem 130 from the front deck section 113 and operable in a closed neck position to locate the stem 130 proximal the front deck section 113; and a neck latch 122 configured to selectively lock the neck hinge 121 in the closed neck position. The scooter also includes a latch release system 150 configured to release the deck latch 112 and the neck latch 122 to prepare the scooter for transition between a ride mode and a tow mode; wherein the deck hinge 111 occupies the open deck position and the neck hinge 121 occupies the open neck position in the ride mode; and wherein the deck hinge 111 occupies the closed deck position and the neck hinge 121 occupies the closed neck position in the tow mode.

2. Applications

Figure 2A:
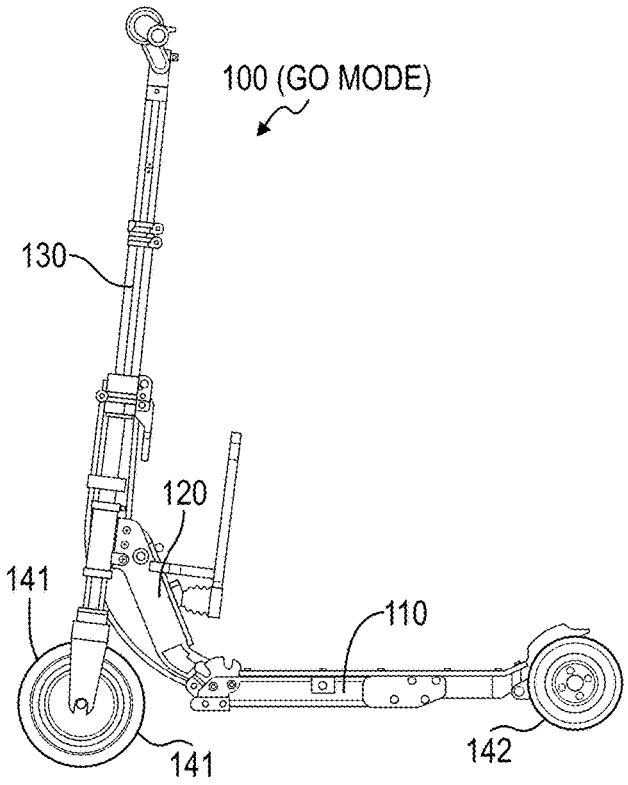
FIGS. 2A-2C are schematic representations of a scooter.
Figure 2B:
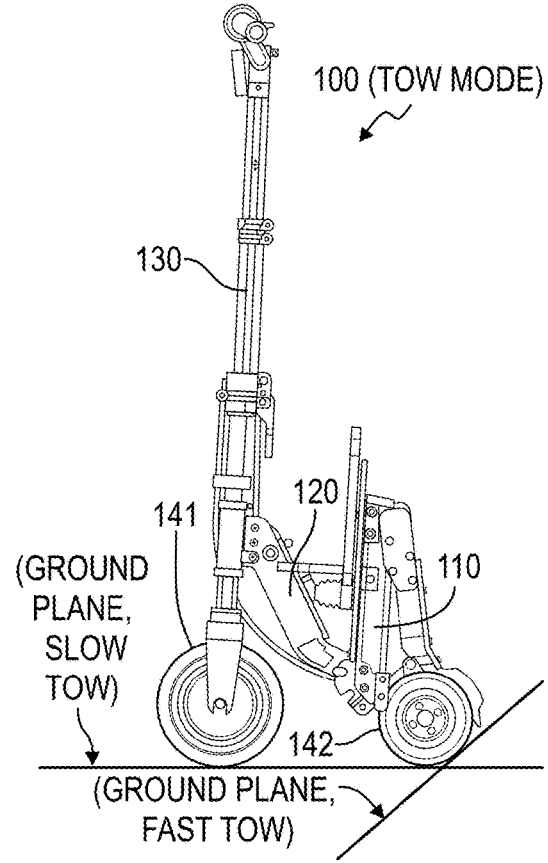
Figure 2C:
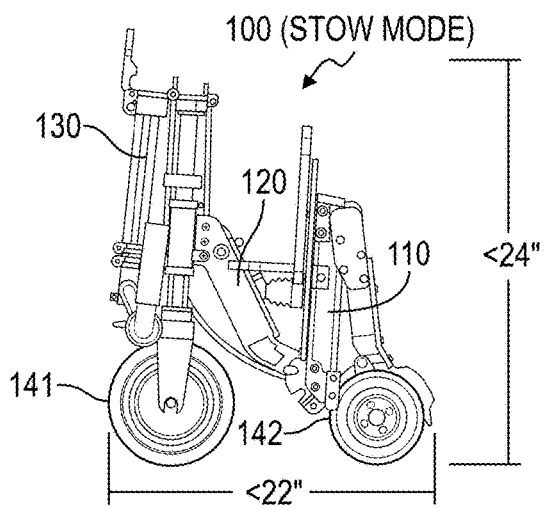
Figure 3:
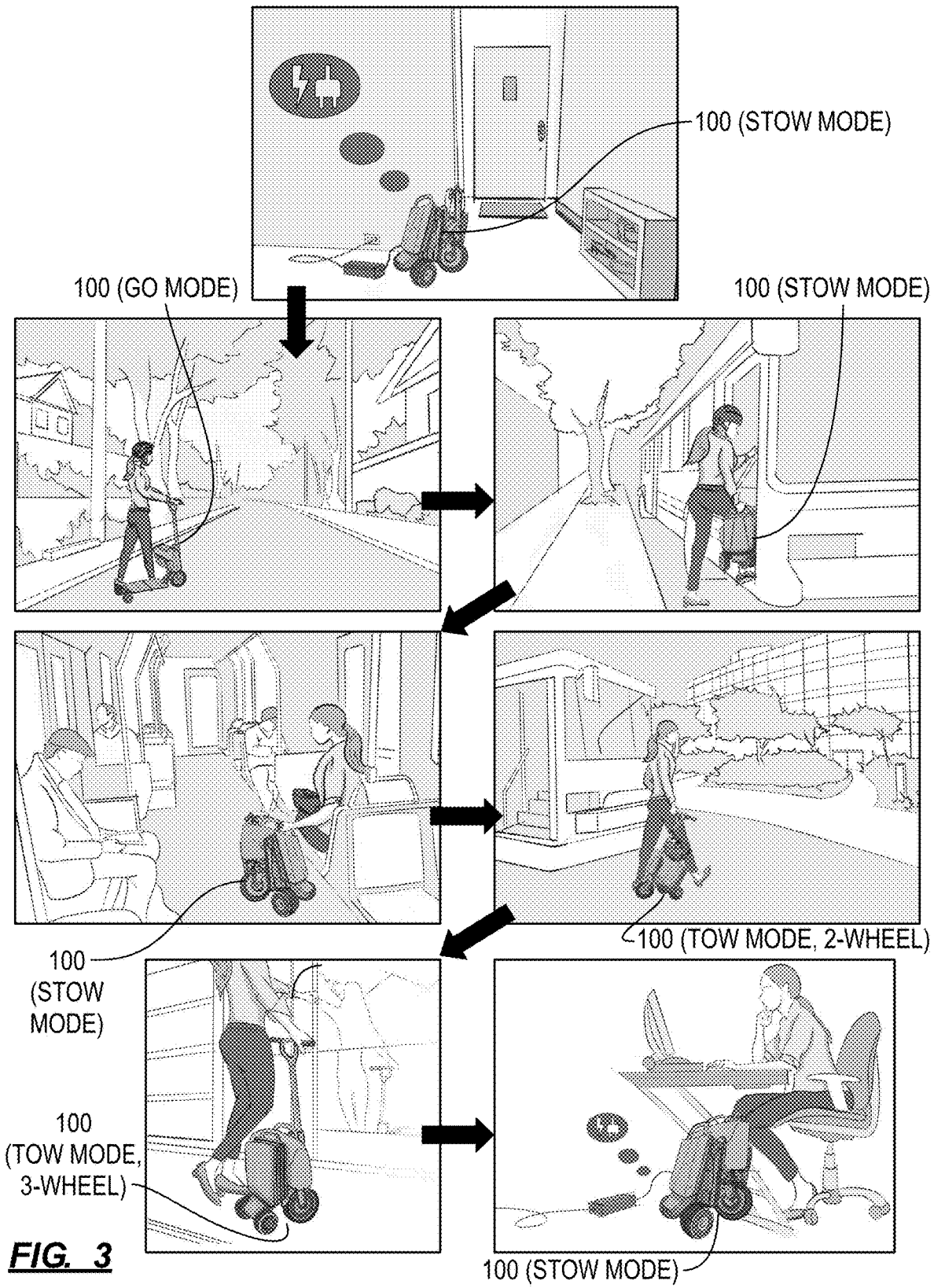
FIG. 3 is a flowchart representation of one variation of the scooter.
Figure 4:
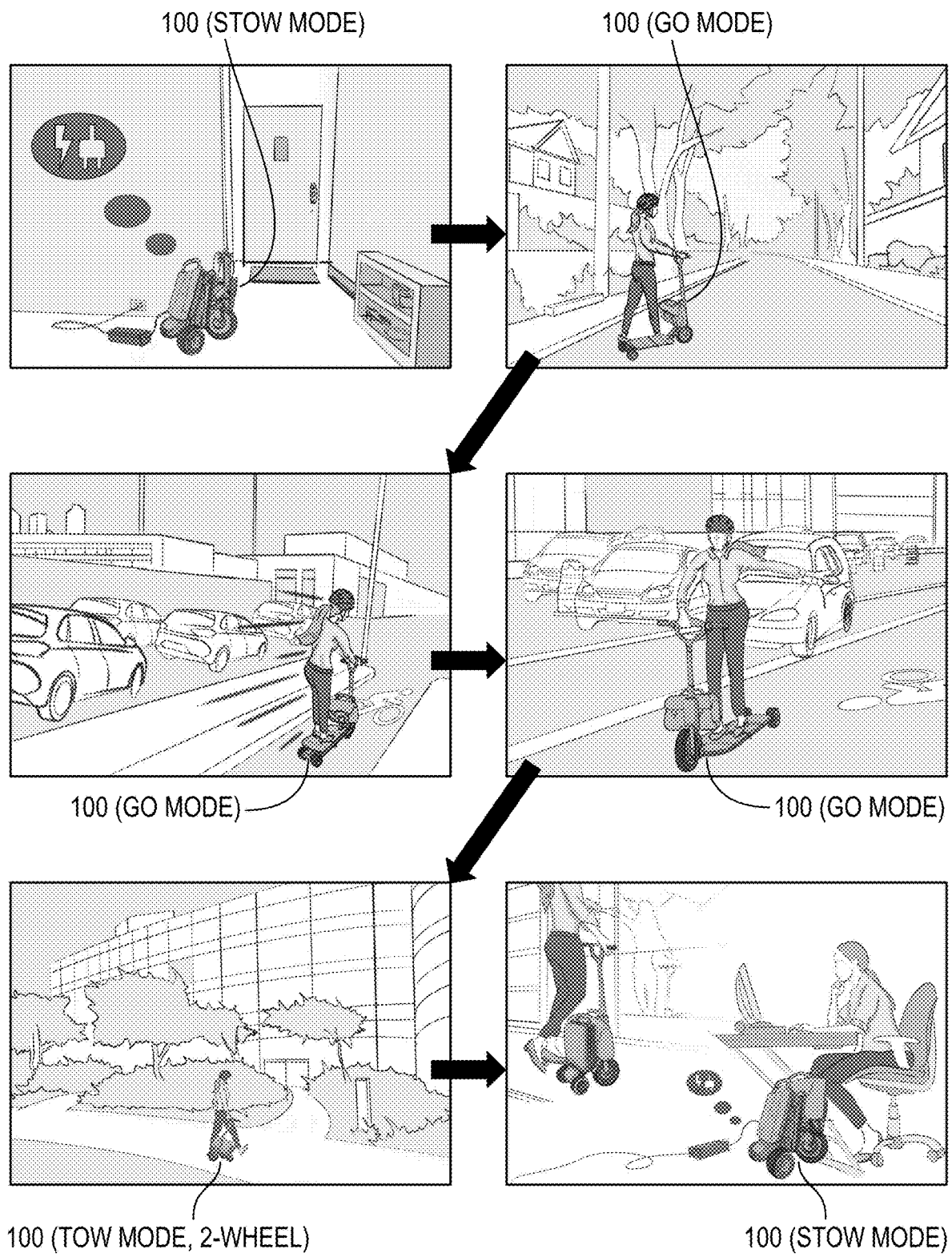
FIG. 4 is a flowchart representation of one variation of the scooter.

Generally, the scooter 100 defines a three-wheeled electric mobility platform: operable in "go", "tow", and "stow" modes and configured to be rapidly transitioned between these modes by a user with minimal stooping and minimal manual manipulation by a user, as shown in FIGS. 1, 2A-2C, and 3-4. In particular, in the go mode, the scooter 100 is configured to be ridden by a user and to move under its own electric power to transport the user between locations, such as between the user's home and a first bus stop and between a second bus stop and the user's office during the user's work commute (e.g., the "first mile" and the "last mile" of the user's commute) or nearby from home directly to work or school. The scooter 100 also includes collapsible elements—including a "split deck" and a collapsible neck 120—configured to release via a single release mechanism (e.g., a single lever, or a small number of release mechanisms) that falls to hand near the handlebars to enable a user to rapidly collapse the deck 110 and the neck 120—from the go mode in which the scooter 100 is rideable (as shown in FIGS. 3 and 4) into the tow or stow mode in which the wheelbase of the scooter 100 is dramatically reduced (e.g., by more than 50%)—minimally requiring the user to stoop (i.e., bend down) to manipulate the scooter 100, manipulate the scooter 100 with two hands, or lift the scooter 100. The scooter 100 further includes a telescoping (or otherwise collapsible) stem 130 (or "steer post") configured to be: rapidly lowered in order to reduce the total height of the scooter 100 for storage, such as under a desk or table or in a locker; and rapidly raised to enable a user to comfortably tow the scooter 100, such as by walking with the scooter 100 on its three wheels or by running with the scooter 100 tilted on its two rear wheels only.

Figure 5A:
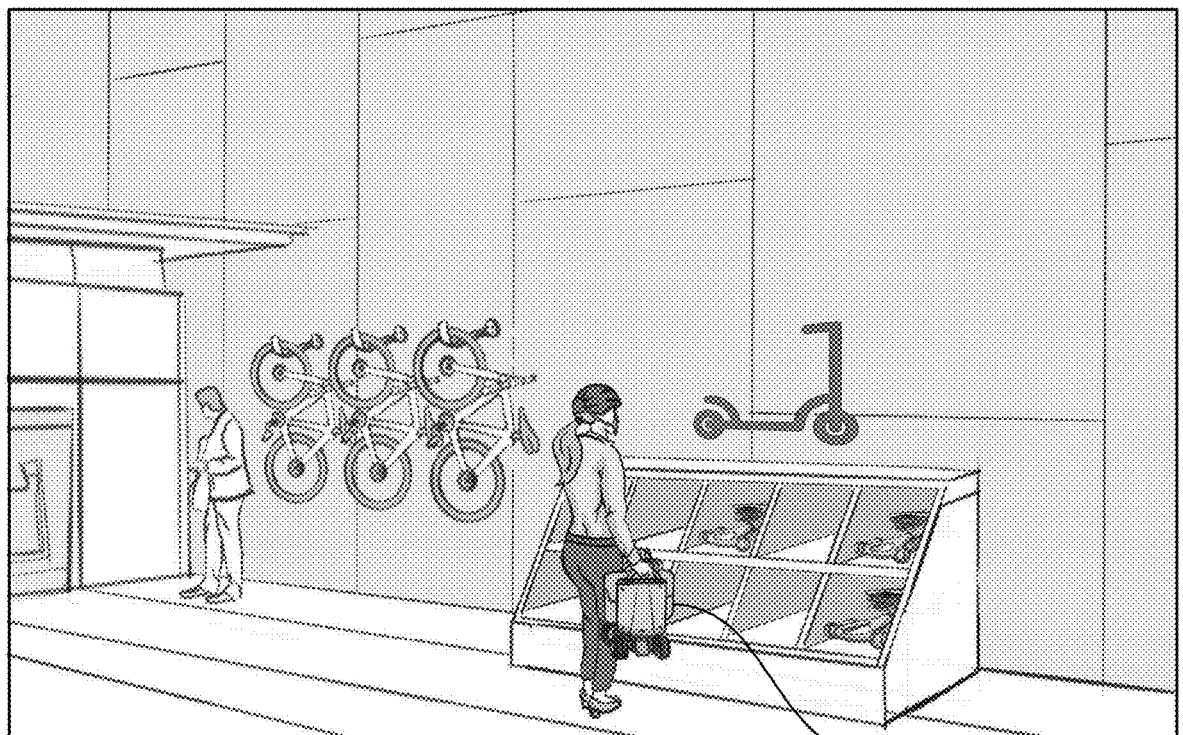
FIGS. 5A and 5B are graphical representation of variations of the scooter.
Figure 6A:
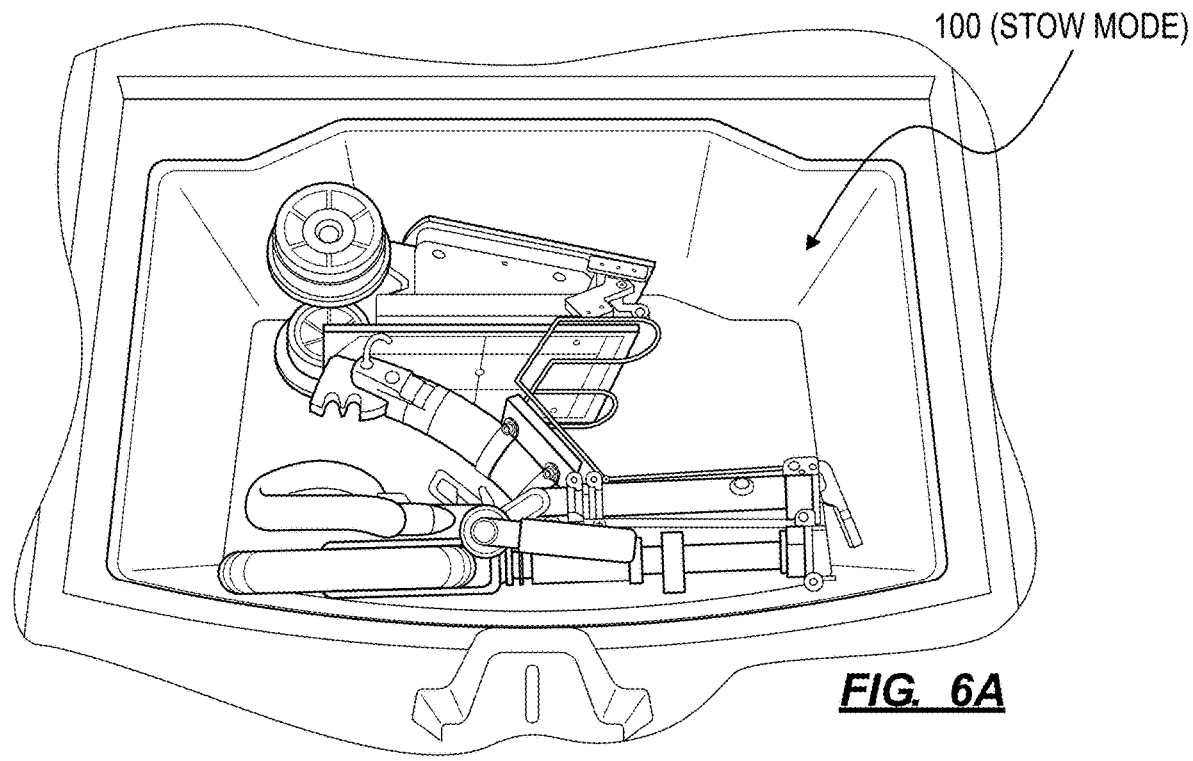
FIGS. 6A-6B are graphical representations of variations of the scooter.

For example, the scooter 100 can define an adult-sized ride-on scooter in the go mode but can collapse to a volumetric footprint of less than 24" by 12" by 22" (e.g., 22" by 11" by 20", or 22" by 9" by 14" i.e., a standard luggage size) in the stow mode, thereby enabling the scooter 100 to be stored in a small trunk (as shown in FIG. 6A) or in a compartment (as shown in FIG. 5a). Moreover, a user can stow three or more scooters 100 in the storage footprint required by one typical bicycle.

Furthermore, the scooter 100 includes three wheels and may therefore be relatively stable when riding in the go mode and may naturally remain upright without assistance from another object (e.g., a user, a wall) in the go, tow, and stow modes.

3. Example Operation

Figure 5B:
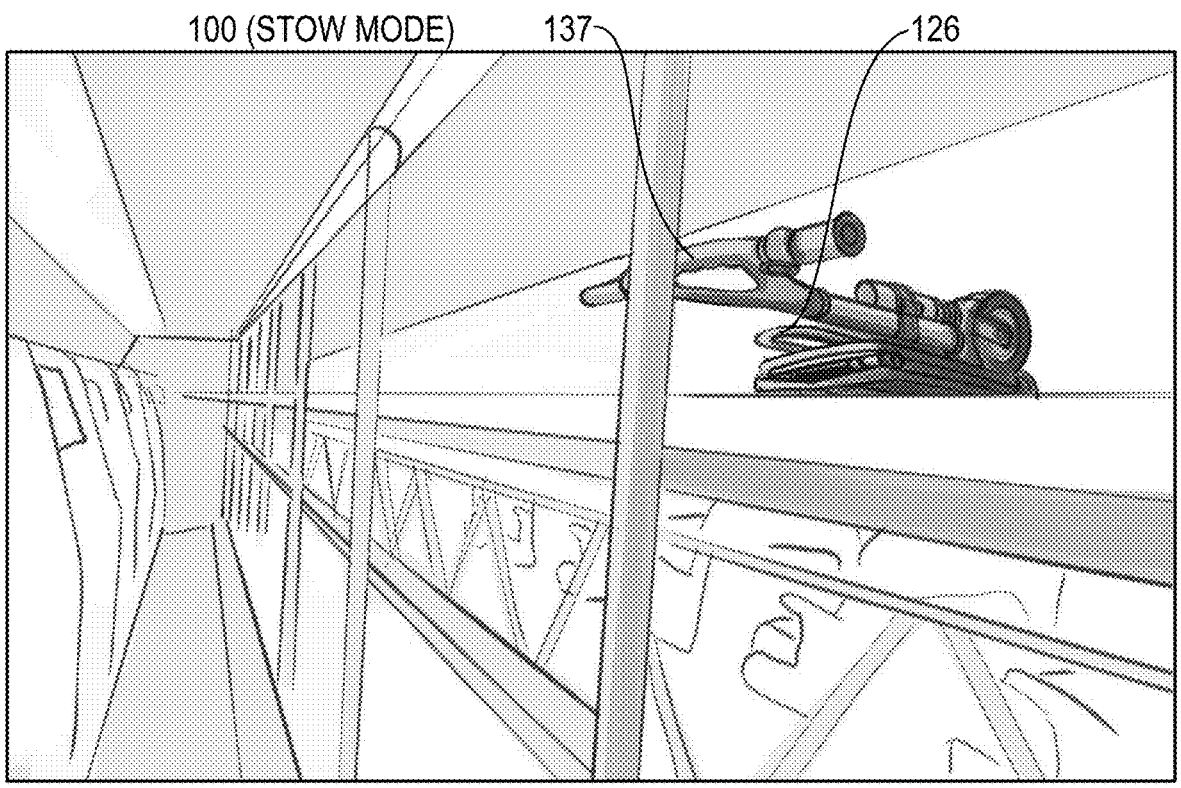

In one example shown in FIGS. 3 and 4, the scooter 100 is stored overnight—in the stow mode—in a coat closet near a front door of a user's home or under a desk in the user's bedroom. While stored in the user's home, the scooter 100 is connected to a wall outlet to recharge. On a work day morning, the user unplugs the scooter 100 from the wall outlet, manipulates the latch release mechanism to raise the stem 130 to a comfortable tow height, and tows the scooter 100 on three wheels out of her front door. The user then grasps a bag mount (described below, or other lift handle) to lift the scooter 100 and to carry the scooter 100 down a set of stairs to the sidewalk in front of her home. The user then manipulates the latch release mechanism (or neck control 151 and deck control 152) to release the deck and neck 120 hinges such that the deck hinge 111 falls into the open deck position and the neck hinge 121 falls into the open neck position—via gravity—while she continues holding the handlebars to fully transition the scooter 100 into the go mode. The user also manipulates the latch release mechanism to adjust the stem 130 to a comfortable riding position, sets her backpack on the scooter by looping an add-a-bag strap on the backpack over the bag mount, steps onto the deck 110, actuates an accelerator control on the handlebars to actuate the motor 147 in the front wheelset, and navigates to a bus stop nearby. Upon arriving at the bus stop, the user again manipulates the latch release mechanism to release the deck and neck 120 hinges, lowers the stem to the deck engaging the neck hinge and then releases the deck hinge as she raises the stem pulling the front deck and rear deck into tow position (or pushes the rear of the deck 110 forward toward the stem 130 with one foot while grasping the handlebars with one hand to fully collapse the deck 110 and the neck 120), and fully collapses the stem 130. When the bus arrives, the user then loads the scooter 100—now in the stow mode—into a storage locker with other luggage under the bus, under a seat on the bus, or in an overhead storage shelf (or between her feet) on the bus, as shown in FIG. 5B.

Upon arriving at a destination bus stop, the user disembarks from the bus, collects the scooter 100, and repeats the foregoing process to transition the scooter 100 back into the go mode, to ride the scooter 100 to her office building, and to transition the scooter 100 back into the tow mode before entering the front door of her office building. The user then walks into her office with the scooter 100 on its three wheels (or if the user is in a hurry, runs into the office with the scooter 100 tilted on its rear wheels), navigates to her desk, manipulates the latch release mechanism to release the stem latch 132, fully collapses the stem 130, pushes the scooter 100—now in the stow mode—under a corner of her desk, and connects a power supply to the scooter 100 to recharge the scooter 100 during work hours.

The user can repeat the foregoing process in reverse to commute home at the end of her workday.

4. Stem and Handlebars

The stem 130 of the scooter 100 includes: a fork 138 on a first end 135; a handlebar on a second end 136; a collapsible (e.g., pivoting and/or telescoping) section between the first end 135 and the second end 136; and a stem latch 132 configured to selectively lock the collapsible section. Generally, the stem 130 and handlebars form forward controls of the scooter 100 and rotatably support the front wheelset off of the neck 120.

In one implementation, the stem 130 includes: a multi-segment metal collapsible section configured to extend by approximately 20"; and a stem latch 132 operable in a first position to retain the collapsible section of the stem 130 at a particular length set by a user and operable in a second position to release the stem 130 and thus enable a user to manually extend or collapse the collapsible section of the stem 130.

The scooter 100 can also include a left handlebar and a right handlebar mounted to the distal end of the stem 130. In one implementation, the left and right handlebars are: operable in a folded state (shown in FIG. 2B) in which the handlebars fold downward to substantially parallel the axis of the stem 130 in order to limit the width of the scooter 100 in the tow and stow modes; and operable in an unfolded state (shown in FIGS. 1A and 10A-10B) in which the handlebars protrude laterally from the stem 130 to provide hand grips for a user riding the scooter 100 in the go mode. Operator controls—such as accelerator, brake, and power ON/OFF controls—can be mounted to or integrated into the handlebars, as described below.

The scooter 100 can further include a center pull handle defining a loop or grab handle integral or distinct from the handlebars and arranged on the distal end of the stem 130, such as between the handlebars and coaxial with the stem 130. In this implementation, the center pull handle can be clutched by a user with a single hand while the handlebars are collapsed, including: when manually towing the scooter 100 in the tow mode; and when transitioning the scooter 100 from the stow or tow mode into the go mode and before opening the handlebars into the unfolded state in preparation for riding the scooter 100.

In one implementation, the stem 130 includes: a first stem section 133 coupled to the front wheelset 141 and pivotably coupled to the neck hinge 121; a second stem section 134 coupled to the set of handlebars 131 and configured to locate the set of handlebars 131 at a first distance from the front wheelset 141 in an extended stem position and to locate the set of handlebars 131 at a second distance from the front wheelset 141 in a retracted stem position, the second distance less than the first distance; and a stem latch 132 configured to transiently retain the second stem section 134 in the extended stem position and the retracted stem position relative to the first stem section 133. For example: in the go mode, the deck hinge 111 can occupy the open deck position, the neck hinge 121 can occupy the open neck position, and the second stem section 134 can occupy the extended position; and—in the stow mode—the deck hinge 111 can occupy the closed deck position, the neck hinge 121 can occupy the closed neck position, and the second stem section 134 can occupy the retracted position.

5. Deck

As shown in FIGS. 1 and 2A-2C, the deck 110 includes: a front deck section 113 (or front deck segment); a rear deck section 114 (or rear deck segment) supporting the rear truck 143 opposite the front deck section 113; and a deck hinge 111 interposed between the front deck section 113 and the rear deck section 114, rideable in an open deck position when the scooter 100 is in the go mode, and operable in a closed deck position when the scooter 100 is in the tow or stow mode; and a deck latch 112 configured to selectively lock the deck hinge 111 in the open deck position and in the closed deck position. Generally, the deck 110 defines a "split deck" including front and rear deck sections: hinged via deck hinge 111; operable in the open deck position to form a substantially planar (or "flat") deck on which a user may stand when riding the scooter 100 in the go mode; and operable in the closed deck position in which the deck hinge 111 is lifted above the rear axle to collapse the front and rear deck sections and to shorten the wheelbase of the scooter 100 when the scooter 100 is in the tow or stow mode.

Figure 7A:
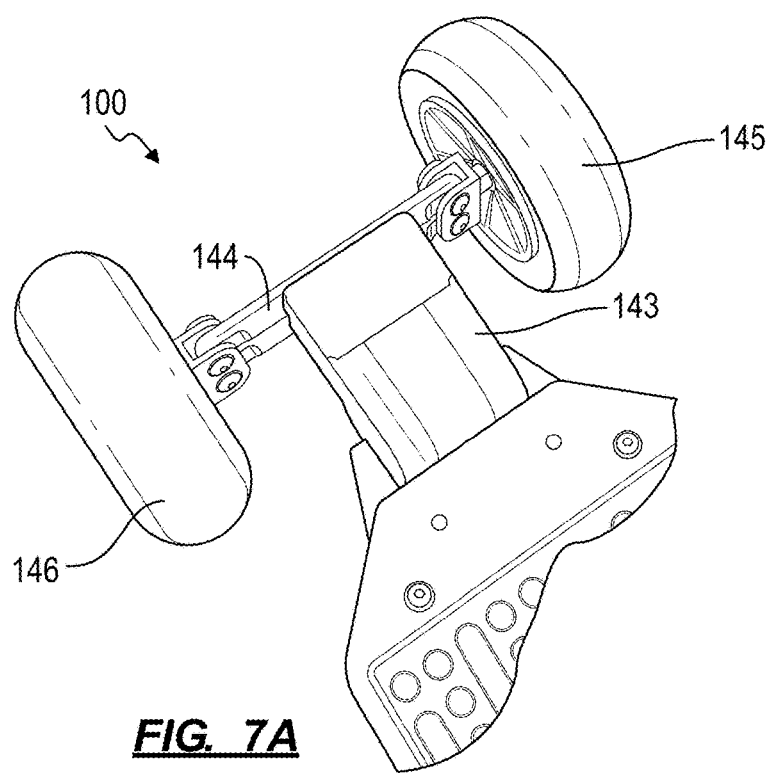
FIGS. 7A and 7B are schematic representations of variations of the scooter.
Figure 7B:
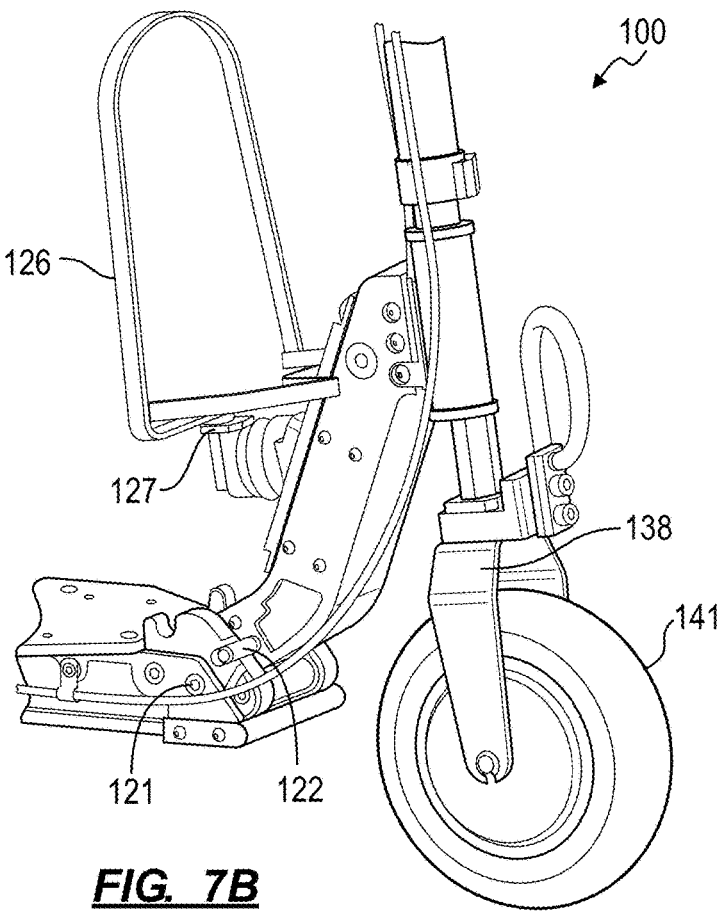

Furthermore, the rear deck section 114 carries the two rear wheels, such as mounted to a rear axle in the form of a "truck" configured to pivot about a yaw axis as a rider on the scooter 100 leans about a roll axis (e.g., when turning). Alternatively, the truck can include a four-bar linkage 144 that maintains parallelism between the rear wheels but permits camber changes between the rear wheels, as shown in FIG. 7A, or a "lean only" 4 bar linkage with no "steer" or camber changes. Yet alternatively, the truck can mount the rear wheels on independent-spring suspension arms. However, the truck can locate the rear wheels in any other way.

The front deck section 113 supports the neck 120—which carries the front wheelset and handlebars via the stem 130—opposite the rear wheels.

In one implementation, the deck hinge 111 extends parallel to the left-right lateral axis of the scooter 100, is configured to pivotably couple the front and rear deck sections, and is operable in the open position and in the closed position. In the open position, the deck hinge 111 defines an included angle of approximately 180° such that the front and rear deck section 114 are substantially parallel and form a substantially flat deck surface on which a user may stand while operating (i.e., riding) the scooter 100. Thus, in the open position, the deck hinge 111 falls near the same height off a ground surface as the rear axle, and the front and rear axles are separated by a maximum longitudinal offset distance (i.e., a "wheelbase"), such as approximately 32". In the closed position, the deck hinge 111 defines an included angle of approximately 0° (or less than 30°) and rises above the front and rear axles as the front and rear deck sections are folded together. Thus, in the closed position, the front and rear axles are drawn together and separated by a minimum longitudinal offset distance, such as approximately 12 inches, in order to reduce the total wheelbase of the scooter 100.

In a similar implementation, the front deck surface 118 and the rear deck surface 119 can: define a deck angle between 170° and 190° when the deck hinge 111 occupies the open deck position; and define the deck angle between −15° and +15° when the deck hinge 111 occupies the closed deck position. Additionally, the front deck surface 118 and the stem 130 can: define a neck angle between 80° and 100° when the neck hinge 121 occupies the open neck position; and define the neck angle between −15° and +15° when the neck hinge 121 occupies the closed neck position. For example, in the stow mode: the deck hinge 111 and the neck hinge 121 can cooperate to locate a frontmost point of the front wheelset 141 within 22" of a rearmost point of the rear wheelset 142; and the deck hinge 111, the neck hinge 121, and the stem latch 132 can cooperate to locate a topmost point of the set of handlebars 131 within 24" of a bottommost point of the set of front wheelset. In this example, in the go mode: the deck hinge 111 and the neck hinge 121 can also cooperate to locate the frontmost point of the front wheelset 141 out to 39" from the rearmost point of the rear wheelset 142; and the deck hinge 111, the neck hinge 121, and the stem latch 132 can cooperate to locate the topmost point of the set of handlebars 131 up to 49" from the bottommost point of the set of front wheelsets. Therefore, the scooter can collapse to an effective profile area of less than 33% of the max effective profile area of the scooter in go mode.

In another implementation, the deck hinge 111 can: locate the front deck surface 118 tangent to the rear deck surface 119 to form a substantially continuous deck surface in the open deck position; and separate the front deck section 113 from the rear deck section with the deck hinge 111 located above the rear truck 143 in the closed deck position. Additionally, the neck hinge 121 coupled to the front deck section 113 can: locate the stem 130 at a first angular offset from the front deck section 113 in the open neck position; and locate the stem 130 proximal and at a second angular offset from the front deck section 113 in the closed neck position, the second angular offset less than the first angular offset.

The deck can also include a deck latch 112: configured to lock the deck hinge 111 in the open position when the scooter 100 is in the go mode; and configured to release the deck hinge 111 to enable a user to return the scooter 100 to the tow or stow mode (i.e., by transitioning the deck hinge 111 to the closed position). For example, the deck latch 112 can include a mechanical latch integrated into the deck hinge 111 and operated via a cable, or solenoid, or other actuator. The deck latch 112 can also be configured to lock the deck hinge 111 in the closed position until actuated. Additionally or alternatively, the scooter 100 can include a magnetic element integrated into the underside of the front deck section 113 proximal the neck 120 and configured to mechanically couple to a ferrous (e.g., steel) surface on or near the rear truck 143 when the deck hinge 111 is transitioned from the open position to the closed position (i.e., when the scooter 100 is transitioned from the go mode to the stow or tow mode). In particular, the deck latch 112 or magnetic element can retain the deck hinge 111 in the closed position with the front and rear wheels adjacent to one another (e.g., retain the scooter's wheelbase at approximately 15" while the scooter 100 is towed or stowed.

In another implementation, the deck hinge 111 can be operable by a deck control 152 configured to release the deck hinge 111 for transition of the deck between the open deck position and the closed deck position. For example, the deck control 152 can: release the deck hinge 111 to transition the deck hinge 111 to the open deck position wherein the deck hinge 111 occupies the closed deck position and the neck hinge 121 occupies the closed neck position in the tow mode of the scooter for towing by the user.

The deck hinge 111 can also include an integrated stop configured to prevent the deck hinge 111 from opening past a maximum included angle (e.g., approximately 180°) such that the front and rear deck sections remain substantially parallel to the ground when loaded with a user when the scooter 100 is in the go mode. In one variation, the scooter can include: a front deck segment defining a substantially flat front deck surface 118 configured to carry a rider; a rear deck segment defining a substantially flat rear deck surface 119 configured to carry the rider; a deck hinge 111 interposed between the front deck segment and the rear deck segment and configured to transiently engage a ride deck stop 115 and a tow deck stop 116; and a neck hinge 121 coupled to the front deck segment opposite the deck hinge 111 and configured to transiently engage a ride neck stop 124 and a tow neck stop 125.

Figure 8A:
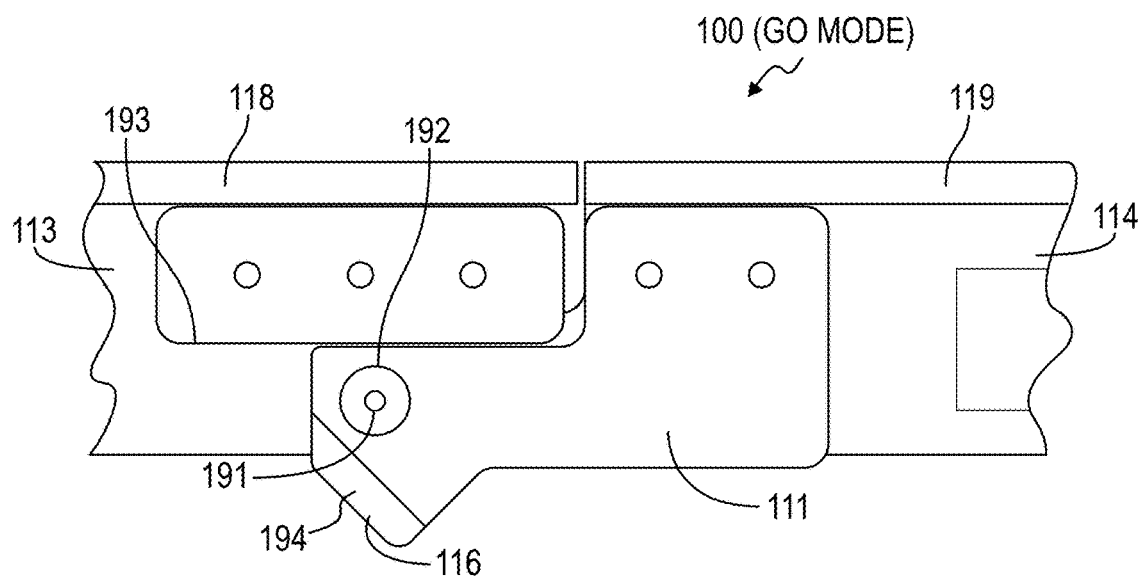
FIGS. 8A and 8B are schematic representations of one variation of the scooter.
Figure 8B:
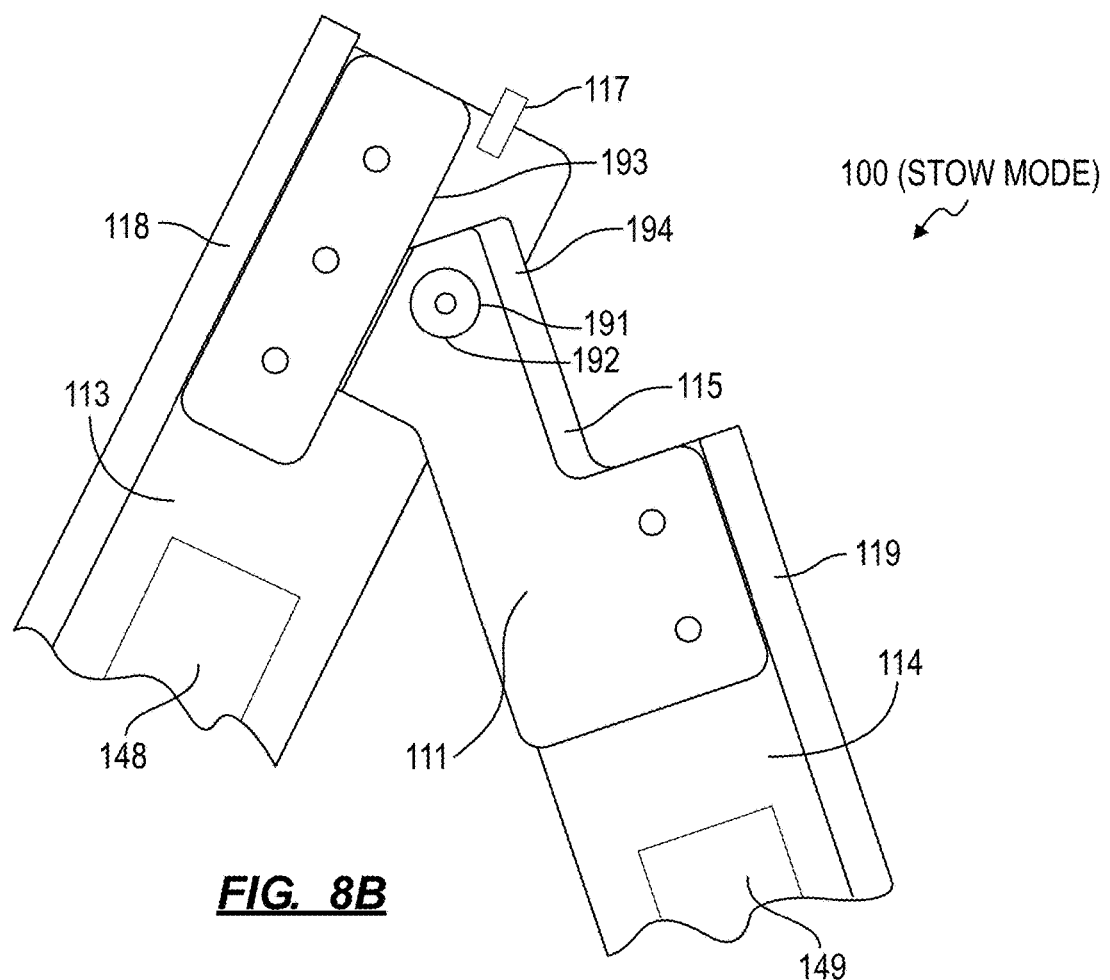
Figure 9A:
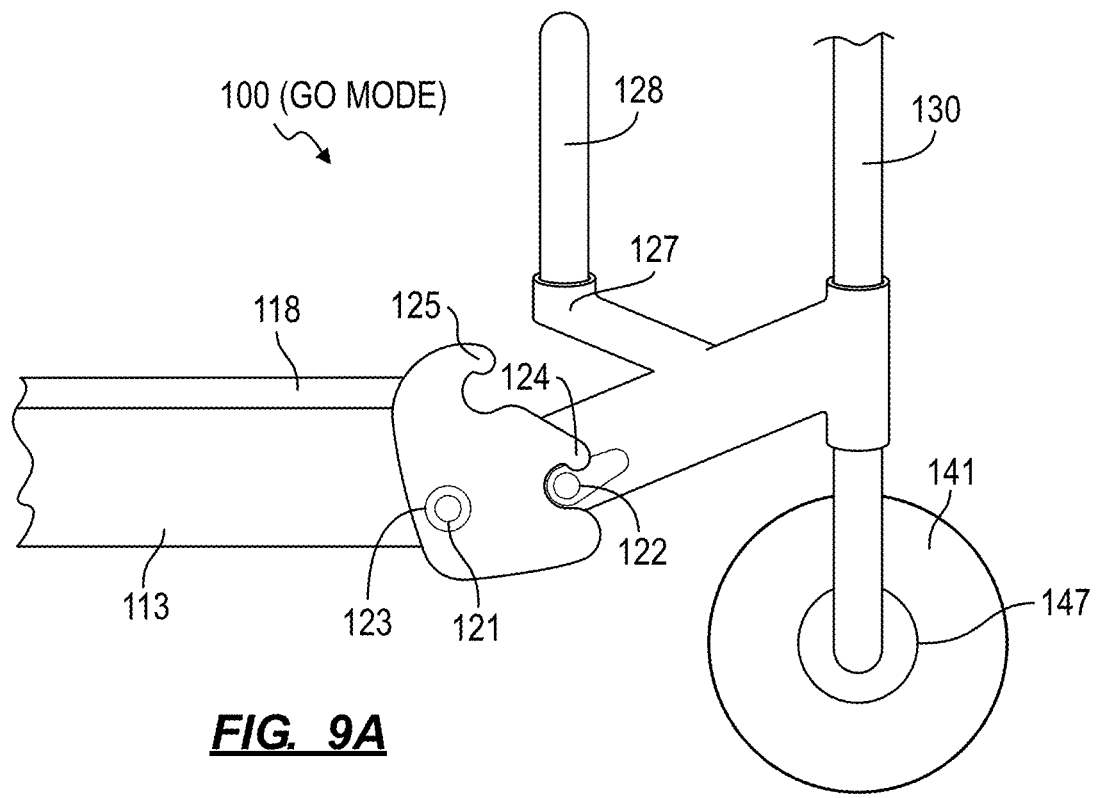
FIGS. 9A and 9B are schematic representations of one variation of the scooter.
Figure 9B:
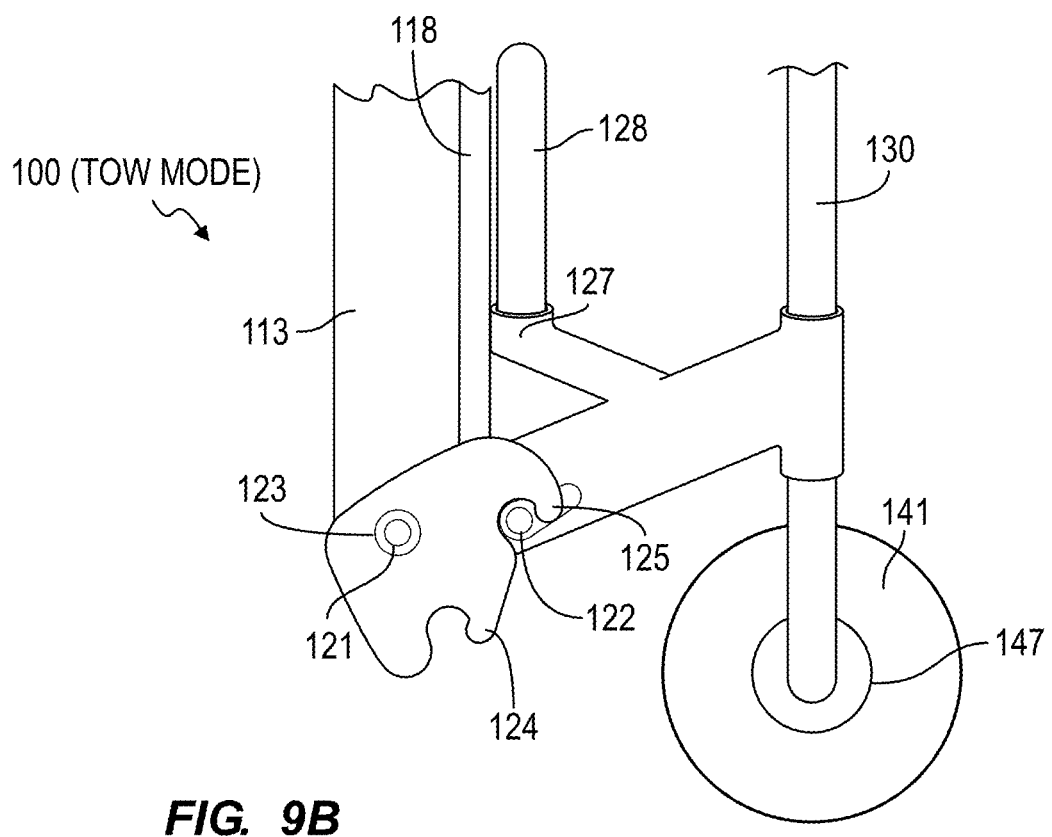

In one implementation shown in FIGS. 8A and 8B, the deck can include: a left stop arranged on a left side of the front deck section 113 and defining a left wedged stop face 193 extending opposite the front deck surface 118; and a right stop arranged on a left side of the front deck section 113 and defining a wedged face extending opposite the front deck surface 118; and a deck hinge 111 defining a pivot 191 longitudinally inset from a rear face of the front deck. The deck hinge 111 can include: a left hinge knuckle 192 extending longitudinally along a left side of the rear deck, pivotably coupled to a left side of the pivot 191 at the front deck, and defining a left wedged knuckle face 194 extending toward the rear deck surface 119; and a right hinge knuckle 192 mirroring the left hinge knuckle 192. Thus, when the deck hinge 111 occupies the open position the left wedged face of the left knuckle engages the left wedged face of the left stop and the right wedged face of the right knuckle engages the right wedged face of the right stop such that the knuckles cooperate with the stops to define an elongated bearing surface that carries a dynamic load of a rider to remove or reduce the load of the rider on the pivot 191. Additionally, the wedged stops restrict movement about the pivot 191 and restrict movement of the front deck section 113 with respect to the rear deck section 114 such as to reduce vibration and increase stability for the rider.

The deck 110 can further include a deck spring 117 coupled to the deck hinge 111 and configured to bias the deck hinge 111 toward the closed position. In particular, when the deck hinge 111 is latched in the open position by the deck latch 112 and the deck latch 112 is subsequently released, the deck spring 117 can apply a torque to the deck hinge 111 to draw the deck hinge 111 toward the closed position, which may draw the front and rear wheels together along the longitudinal axis of the scooter 100 and lift the deck hinge 111 above the rear axle. The deck latch 112 can then lock the deck hinge 111 in the closed position (or the magnetic element can couple the front and rear deck sections) to retain the deck hinge 111 in the closed position and to retain the scooter 100 in the stow or tow mode. For example, once the deck latch 112 is released and with the deck spring 117 biasing the deck hinge 111 partially toward the closed position, the user—standing behind and facing the scooter 100—may brake the rear deck section 114 with one foot and manually draw the center pull handle backward toward her with one hand, bringing the front wheelset closer to the rear axles, until the deck latch 112 catches in the closed position to retain the deck hinge 111 fully in the closed position and to retain the scooter 100 fully in the stow or tow mode.

In another implementation shown in FIGS. 8A and 8B, the deck spring 117—interposed between the front deck section 113 and the rear deck section 114—is configured to bias a front side surface of the front deck section 113 about the deck hinge 111 and away from a rear side surface of the rear deck section 114. For example, the front side surface and the rear side surface can be positioned flush in the open deck position and—in response to the deck control 152 releasing the deck hinge 111—the deck spring 117 can apply a spring force to separate the front side surface from the rear side surface to transition the deck to the closed deck position of the tow mode or the stow mode.

6. Neck

As shown in FIGS. 2A-2C and 9A-9B, the neck 120 can: pivotably couple to and retain a length of the stem 130 between the fork 138 and the collapsible section; couple to the front deck section 113 opposite the rear deck section 114; include a neck hinge 121 operable in an open position when the scooter 100 is in the go mode; operate in a closed position when the scooter 100 is in the tow mode; and include a neck latch 122 configured to selectively lock the neck hinge 121 in the open and closed positions. In one implementation: the neck hinge 121 is coupled to the front deck section 113 opposite the deck hinge 111; and the neck control 151 is configured to release the neck hinge 121 for transition between an open neck position and a closed neck position such that the deck hinge 111 occupies the open deck position and the neck hinge 121 occupies the open neck position in a go mode of the scooter for riding by a user (or "ride mode") and such that the deck hinge 111 occupies the closed deck position and the neck hinge 121 occupies the closed neck position in a tow mode of the scooter for towing by the user.

The neck 120 can include: a lower section fixedly coupled to the anterior end of the front deck section 113; and an upper section configured to carry the stem 130. The neck hinge 121 thus can pivotably couple the upper neck 120 section to the lower neck 120 section and front deck section 113. Furthermore, the upper neck 120 section can include both: a bearing or bushings to enable the stem 130 to rotate relative to the neck 120; and a thrust bearing, tapered bearing, or thrust washer configured to carry a vertical load of the scooter 100 into the fork 138 located at the proximal end of the stem 130.

Like the deck latch 112, the neck latch 122 can be configured to lock the neck hinge 121 in both the open and closed positions. In particular, when the scooter 100 is in the go mode: the deck hinge 111 can form an included angle of approximately 180°; and the neck hinge 121 can form an included angle of approximately 80° such that the stem 130 exhibits an effective rake angle of approximately 10°. However, in the tow and stow modes, the neck hinge 121 can form an included angle of approximately 0° such that the axis of the stem 130 and the top surface of the front deck section 113 are substantially parallel and adjacent in order to limit the volumetric footprint of the scooter 100.

In a similar implementation, the front deck surface 118 and the stem 130: define a neck angle between 80 and 100° when the neck hinge 121 occupies the open neck position; and define a neck angle between −15° and +15° when the neck hinge 121 occupies the closed neck position. For example, the neck hinge 121 can locate the stem 130 at a first angular offset from the front deck section 113 in the open neck position; and locate the stem 130 proximal and at a second angular offset from the front deck section 113 in the closed neck position, the second angular offset less than the first angular offset. Therefore, the scooter can collapse to a compact tow mode without the front deck surface interfering with a bag storage area defined by the bag mount parallel with the stem.

Similarly, the neck 120 can further include a neck 120 spring configured to bias the neck hinge 121 toward the closed position. When the user thus manipulates the latch release mechanism (or neck control 151, deck control 152, and stem control 153) to transition the scooter 100 from the go mode to the tow or stow mode, the neck 120 spring and the deck spring 117 can cooperate to: draw the top surface of the front deck section 113 toward the stem 130; lift the deck hinge 111; and draw the rear wheels toward the front wheel. The neck spring 123 can be interposed between the neck and the front deck section 113 configured to drive a neck deck surface about the neck hinge 121 and toward the front deck surface 118 of the front deck section 113.

7. Drivetrain

The scooter 100 can also include a drivetrain, such as including: a front wheelset 141 mounted to the stem 130 (e.g., at the fork 138); a motor 147 coupled to the front wheelset 141; a battery 148; a motor controller; and a rear wheelset 142 (e.g. passive rear wheels) mounted to the rear truck 143 coupled to the posterior end of the rear deck section 114. Generally, the front wheelset 141 can be coupled to the stem 130 opposite the set of handlebars 131; and the rear wheelset 142 can be coupled to the rear deck section 114 opposite the deck hinge 111. In particular, the front wheelset 141 can include a single [or dual] motorized wheel configured to steer the scooter via the stem 130.

In one implementation, the rear wheelset 142 can include: a rear truck 143 including a four-bar linkage 144 (or "parallelogram linkage") and coupled to the rear deck section 114 opposite the deck hinge 111; a first rear wheel 145 rotatably coupled to a first side of the four-bar linkage 144; and a second rear wheel 146 rotatably coupled to the four-bar linkage 144 opposite the first rear wheel 145. In this implementation, the two rear wheels can—via the four-bar linkage 144—dynamically adjust to the shifting load applied by the rider to increase stability by engaging both rear wheels to maintain contact with the road while the scooter turns.

In one implementation, the front wheel includes a hub motor 147 and defines a first diameter greater than a second diameter of the rear wheels. For example: the front wheel can be approximately 8" in diameter and can include a solid or pneumatic rubber tire; and the rear wheels can be solid urethane or other high-durometer polymer and can be approximately 6" in diameter.

The rear wheels can also extend rearward of the perimeter of the rear deck section 114—in a plan view—such that approximately 270° of the circumference of the rear wheels remains open and unobstructed by the deck. Thus, as the deck hinge 111 pivots from the closed position to the open position by approximately 180°, the rear wheels may remain clear of the rear deck section 114 and thus continue to roll on a ground surface substantially unobstructed throughout this range of motion. Furthermore, when the user transitions from towing the scooter 100 slowly in a "three-wheeled mode" (as shown in FIGS. 2B and 3) to quickly in a "two-wheeled mode" (as shown in FIGS. 2B and 4), the user may tip the scooter 100 backward up to approximately 40° and push forward or drag the scooter 100 backward via the center pull handle. Because the rear wheels are exposed from the rear deck section 114 for approximately 270°, the rear wheels can continue to roll on the ground surface unobstructed by the rear deck section 114 even when the user transitions between the "three-wheeled mode" and the "two-wheeled mode" in the tow mode and without any further significant mechanical reconfiguration of the scooter 100 by the user.

In this implementation, the rear wheel set can define a maximum width of 12". For example, the rear wheelset 142 can include a left rear wheel 145 and a right rear wheel 146 such that a first outermost point of the left rear wheel 145 is within 12" of a second outermost point of the right rear wheel 146. The deck can also define a maximum width of less than or equal to 12", and the handlebars can define or collapse to a maximum width of less than or equal to 12". Thus, in this implementation, the scooter can collapse to a maximum rectilinear volume within a standard luggage size (e.g., 22" by 14" by 9") in the stow mode. In another implementation, the scooter can collapse to a maximum rectilinear volume within 24" by 22" by 12".

The scooter 100 can also include a battery 148 in one or both of the front and rear deck sections. For example, a single front battery 148 can be integrated into the neck or front deck section 113 only, such that the battery 148 is nearest the powered front wheel. In this implementation, in order to limit complexity of power transmission between the battery 148 and the powered front wheel, the scooter 100 can also include a front motor controller integrated into the front neck or deck and configured to output a modulated power signal to the front wheel via flexible power transmission cable passing through or adjacent the hinged neck 120.

Alternatively, the scooter 100 can include a front battery 148 in the front deck section 113 and a rear battery 148 in the rear deck section 114. In this implementation, the front and rear batteries can be electrically coupled via flexible power transmission cable running through (or adjacent) the deck hinge 111 in order to cooperatively supply power to the powered front wheel; and the motor controller in the front deck section 113 can source power from both the front and rear batteries to output a modulated power signal to the front wheel via flexible power transmission cable passing through or adjacent the hinged neck 120.

In one variation, one or both rear wheels are powered in addition to or instead of the front wheel. For example: the rear truck 143 can include a rotating axle; the rear wheels can be locked to the axle; and the scooter 100 can include a rear motor 147 coupled to the rear axle—such as via a belt drive or gear train—and configured to rotate the rear axle and thus power the rear wheels. Alternatively, one or both rear wheels can include a hub motor 147 configured to independently drive the rear wheels. In this variation: a front battery 148 can be integrated into the front deck and configured to power the front wheel via a front motor controller; and a rear battery 148 can be integrated into the rear deck and configured to power one or both rear wheels via a separate rear motor controller.

In another variation, the scooter 100 can include: a front wheelset 141 configured to passively rotate about a front axle; and a rear wheelset 142 configured to passively rotate about a rear axle, such that the scooter 100 can be operated by the user propelling the scooter 100 via foot-power alone (e.g., a manual scooter not including a motor or battery).

7.1 Variation: Replaceable Batteries

In one variation, the front and/or rear deck sections define battery slots configured to transiently receive battery modules. More specifically, the front and rear deck sections can define battery slots configured to accept exchangeable batteries in order to enable a user to "hot swap" discharged batteries for recharged batteries.

In one implementation, the front deck defines a front battery slot with an opening adjacent and facing the deck hinge 111. The front battery slot can also include a front battery catch (e.g., a spring-loaded latch) configured to physically constrain a battery 148 within the front battery slot but also manually operable to release a battery 148 from the front battery slot. Thus, when the scooter 100 is in the tow or stow mode with the hinge in the closed position, the opening of the front battery slot adjacent the hinge may be both exposed and elevated to a height more physically accessible to a user standing over the scooter 100. The user may then: reach down—with minimal bending over or "stooping"- to manually release the front battery catch; grasp the battery 148 in the front battery slot; and draw this battery 148 out of the front deck section 113 along a substantially vertical path. The user may then insert a replacement battery 148 (e.g., a fully-charged battery 148) back into the front battery slot along a similarly vertical path and press the replacement battery 148 into the front battery slot until the front battery catch latches the replacement battery 148.

Therefore, the front deck section 113 is configured to release a battery 148 via an opening adjacent and facing the deck hinge 111—when the deck hinge 111 is in the closed position and thus elevated substantially above the rear axle—in order to enable a user to conveniently access, remove, and replace a battery 148 in the front deck section 113 with minimal or no stooping, without requiring the scooter 100 to be turned over, and without requiring the scooter 100 to be lifted onto a table or work surface in order to access the front battery slot.

The rear deck section 114 can similarly define a rear deck slot including an opening facing the deck hinge 111, including a rear battery catch, and configured to transiently receive a battery 148.

7.2 Charge Port

In another variation, the scooter 100 includes an electrical charge port—to recharge an integrated battery 148—located proximal the deck hinge 111 such that the charge port is elevated above the ground when the scooter 100 occupies the tow and stow modes and such that the charge port falls closer to hand in the tow and stow modes. In one example in which the scooter 100 includes a battery 148 in the front deck section 113, the charge port can be located on a rear face of the front deck section 113 that faces the front of the rear deck section 114 when the deck hinge 111 occupies the open position (e.g., when the scooter 100 occupies the go mode). Thus, the rear deck section 114 can obscure and protect the charge port (e.g., from impact, from debris) when the deck hinge 111 occupies the open position and when the scooter 100 occupies the go mode. However, when the scooter 100 is transitioned to the tow mode or stow mode, the rear face of the front deck section 113 can separate from the front face of the rear deck section 114, thereby enabling physical access to the charge port. Furthermore, with the scooter 100 is transitioned to the tow mode or stow mode, the deck hinge 111 can be elevated further above the ground than in the go mode, thereby reducing a distance the user must bend or reach to access the charge port.

In a similar example, the charge port can be located on a left or right side of the front (or rear) deck section proximal the deck hinge 111.

However, the scooter 100 can include a charge port arranged in any another location and any other configuration of batteries configured to be recharged via the charge port.

8. Operational Controls

The scooter 100 further includes operational controls, such as including: a power ON/OFF switch; an accelerator; and a brake lever. For example: the power ON/OFF switch can be mounted near a center of the distal end of the stem 130, such as adjacent or below the center grab handle; the accelerator can be integrated into the right handlebar as a twist throttle 154; and the brake lever can be integrated into or coupled to the left handlebar as a pull lever.

Thus, when the scooter 100 is in the "ON" state and the accelerator is twisted or otherwise moved by a user, the motor controller can supply power to the front wheel to drive the scooter 100 forward.

The scooter 100 can therefore also include a mechanical brake. For example, the front wheel can define a brake surface on its left and right sides proximal its circumference; and the scooter 100 can include a dual-pivot caliper configured to act on these brake surfaces when the brake lever is actuated by a user. In this example, the dual-pivot caliper can be cable-, hydraulically-, or electronically-actuated. Alternatively, the battery 148, front wheel, and motor controller can cooperate to brake the scooter 100 via electric power regeneration. For example, application of the brake lever can trigger the motor controller to transition the front wheel from a "freewheel" state to a "generator" or "dynamo" state in which energy is captured by the rotating wheel and transferred back into the battery 148.

However, the scooter 100 can include any other operational controls configured in any other way.

9. Mode Controls

Figure 10A:
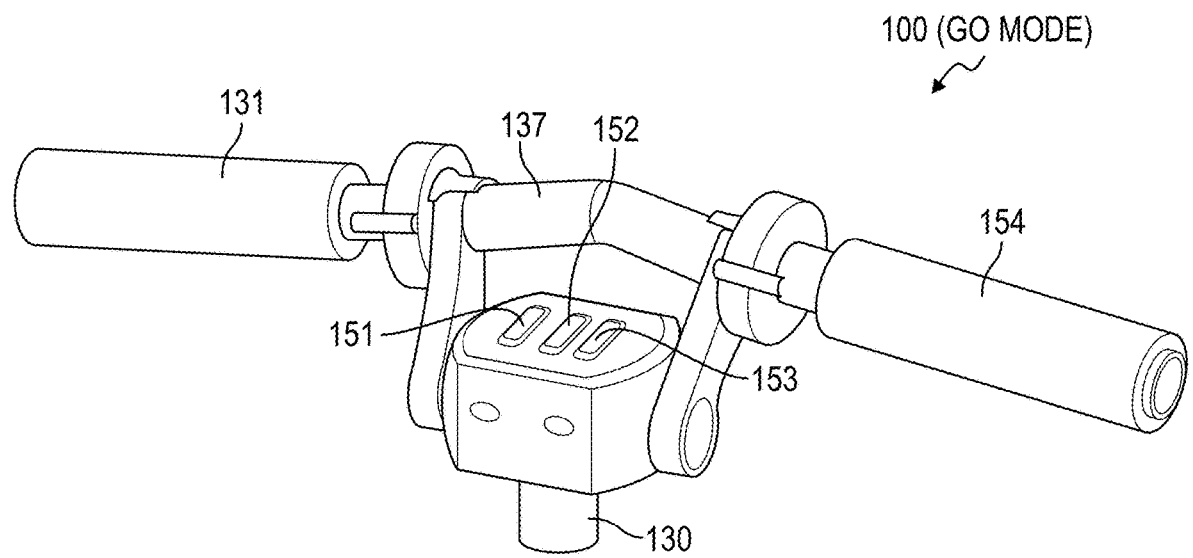
FIGS. 10A and 10B are schematic representations of variations of the scooter.

As shown in FIG. 10A, the scooter 100 can include a latch release system 150 (or a "remote mode control," a "remote latch release mechanism") configured to release the neck 120 hinge, release the deck hinge 111, and release the stem 130 in order to enable a user to transition the scooter 100 between the go, tow, and stow modes, such as with minimal stooping and with minimal manual manipulation. For example, the latch release system 150 can be located on or near the handlebars (or stem) and trigger the neck 120 hinge, the deck hinge 111, and the stem 130 to release when manipulated with a single hand by the user and thus enable the user to transition the scooter 100 between go, tow, and stow modes with minimal persuasion (e.g., a slight tap with one foot) while the user is standing upright over the scooter 100.

The latch release system 150 can include the deck control 152, the neck control 151, and the stem control 153 (or stem latch 132) as a single unit (or separate units) operable at a single location. Alternatively, the release system 150 can be arranged on the stem 130 below the handlebars, such as at a base of the stem 130 below the collapsible section of the step, or on the neck 120, etc.

9.1 Mechanical Controls

In one implementation shown in FIGS. 1, 2A-2C, and 10A-10B, the release system 150 includes a push button, twist grip, or other remote mechanical control mounted to the stem 130, such as integrated into or arranged proximal the center pull handle. In this implementation, the scooter 100 further includes: a first cable sheath fixed on its first end 135 proximal the release system 150 fixed on its second end 136 proximal the neck latch 122 in the neck hinge 121, and including a set of loops between the release system 150 and the neck hinge 121 in order to accommodate extension and collapse of the stem 130; and a first cable running inside the first cable sheath, connected on its first end 135 to the release system 150, and connected on its second end 136 to the neck latch 122. The scooter 100 similarly includes: a second cable sheath fixed on its first end 135 proximal the neck latch 122 in the neck hinge 121 (e.g., opposite the first cable sheath), fixed on its second end 136 proximal the deck latch 112 in the deck hinge 111 and including a loop or excess length proximal the neck hinge 121 in order to accommodate extension and collapse of the neck 120 hinge; and a second cable running inside the second cable sheath, connected on its first end 135 to the neck latch 122, and connected on its second end 136 to the deck latch 112. In this implementation, actuation of the release system 150 can thus: tension the first cable inside the first cable sheath, which shifts the neck latch 122 to unlock the neck 120 hinge; while substantially simultaneously tensioning the second cable inside the second cable sheath, which shifts the deck latch 112 to unlock the deck hinge 111.

9.2 Spring-Loaded Hinges

Furthermore, in one implementation shown in FIGS. 8A and 8B, a neck spring 123 biases the neck hinge 121 toward the closed position and the deck spring 117 similarly biases the deck hinge 111 toward the closed position, such that the neck spring 123 and the deck spring 117 can cooperate to automatically pivot the rear of the front deck section 113 upward toward the stem 130 and to automatically draw the rear of the rear deck section 114 toward the front wheel, thereby raising the deck hinge 111 above the rear axle and shortening the wheelbase of the scooter 100 once actuation of the release system 150 unlocks the neck hinge 121 and the deck hinge 111.

9.3 Mode Transition Process

To transition the scooter 100 from the go mode to the tow or stow mode, the user may: hold the stem 130 (e.g., via the center pull handle) in a roughly fixed vertical position; grasp the release system 150 to unlock the neck latch 122 and deck latch 112; release the release system 150 once the neck hinge 121 and deck hinge 111 are unlocked, as indicated by upward movement of the deck hinge 111; and then push the rear of the rear deck section 114—proximal the rear axle—forward toward the front wheel with her foot until the neck latch 122 and deck latch 112 in their closed positions (e.g., until the neck latch 122 and deck latch 112 lock the neck hinge 121 and deck hinge 111 in their closed positions, respectively, and/or until magnetic elements in the scooter 100 couple to retain the neck hinge 121 and deck hinge 111 in their closed positions). Subsequently, to transition the scooter 100 from the tow or stow mode back to the go mode, the user may: hold the stem 130 (e.g., via the center pull handle); grasp the release system 150 to unlock the neck latch 122 (and the deck latch 112); release the release system 150 once the neck hinge 121 and deck hinge 111 are unlocked, as indicated by downward movement of the deck hinge 111; and then push the deck hinge 111 downward with her foot while maintaining the stem 130 in approximately the same vertical orientation until the neck hinge 121 and deck hinge 111 latch in their open positions.

9.4 Auto-Brake During Mode Transition

In the variation described above in which the scooter 100 includes a mechanical (or magnetic, etc.) brake on the front wheel 141, the mechanical brake can be coupled to the release system 150 or to the neck latch 122 such that actuation of the release system 150 further engages the brake to lock the front wheel, thereby retaining the front axle of the scooter 100 in its current location while the user pushes the rear axle forward toward the front axle with her foot in order to fully transition the neck hinge 121 and deck hinge 111 into their closed positions. Alternatively, the release system 150 can be arranged near a separate brake lever to enable the user to grasp both the release and brake levers in one hand in order to achieve similar functionality while the neck 120 and deck 110 are collapsed. Similarly, the scooter 100 can include a switch or other sensor coupled to the release system 150 and can electronically actuate a front brake or transition the front wheel into a regeneration mode—which may (partially) brake the front wheel—when the release system 150 is actuated in order to achieve similar functionality. In this variation, the scooter 100 can similarly lock the front wheel 141 when the scooter 100 is transitioned from the tow or stow mode into the go mode.

9.5 Concurrent Controls

In this implementation, the release system 150 can be similarly coupled to the neck latch 122 such that the stem 130, deck 110, and neck latch 122 are released substantially simultaneously when the release system 150 is actuated. For example, the scooter 100 can include a third sheath and third cable extending from the neck latch 122 to the stem latch 132 above such that movement of the neck latch 122 to release the neck hinge 121 also moves the stem latch 132 to concurrently unlock the stem 130 for extension or compression. In a similar example, the third sheath and the third cable can couple the release system 150 directly to the stem latch 132; the first sheath and first cable can then couple the stem latch 132 to the neck latch 122; and the second sheath and second cable can couple the neck latch 122 to the deck latch 112 such that actuation of the release system 150 unlocks the stem, neck, and deck latches substantially simultaneously.

9.6 Staged Controls

Alternatively, the stem, neck, and deck latches are configured for staged release when a multistage control 150 is actuated. For example, the third cable can extend from the multistage control 150 directly to the neck latch 122 such that actuation of the multistage control 150 over a first, short distance first releases the stem latch 132 to enable the stem 130 to be extended or retracted. In this example, the first cable can couple the stem latch 132 to the neck latch 122; the first cable can be slightly longer than the effective distance between the stem and neck latches, and a spring between the first cable and the neck latch 122 can carry this slack and absorb initial movement of the first cable when the release latch is actuated over the first distance. However, further actuation of the multistage control 150 over a second distance can engage the first cable against the neck latch 122 to release the neck 120 hinge. Furthermore, the second cable can couple the neck latch 122 to the deck latch 112; the second cable can be longer than the effective distance between the neck latch 122 and deck latch 112, and a spring between the second cable and the deck latch 112 can carry this slack and absorb movement of the second cable when the release latch is actuated over the first and second distances. However, further actuation of the multistage control 150 over a third distance can engage the second cable against the deck latch 112 to release the deck hinge 111. Therefore, in this implementation, a user may actuate the multistage control 150 over the first distance in order to release the stem latch 132 and then raise or lower the stem 130. By further actuating the multistage control 150, the user may fold the neck 120 into the closed position for elongated storage of the scooter 100 (e.g., in a narrow, elongated duffel bag). By actuating the multistage control 150 fully, the user may transition the scooter 100 from the go mode into the tow mode by collapsing the neck hinge 121 and deck hinge 111 but maintaining the stem 130 in its elongated state; or into the stow mode by collapsing the neck 120 and desk hinges and lowering the stem 130 down into its fully retracted state.

However, in this implementation, the stem, neck, and/or deck latches can be coupled to the multistage control 150 in any other configuration for staged release of these latches in any other order. Therefore, the stem latch 132 can be released substantially concurrently with the neck latch 122 and deck latch 112 to enable the user to extend or retract the stem while transitioning the neck hinge 121 and deck hinge 111 between open and closed positions (i.e., when transitioning the scooter 100 between the go, tow, and stow modes).

In one implementation, the latch release system 150 selectively releases each hinge based on the current configuration (e.g., a mode, position) of the scooter 100. For example, while the scooter 100 is upright in the go mode, the latch release system 150 can initially release the neck hinge 121 from the open neck position in response to selection of the neck control 151, thereby enabling the user to close the neck hinge 121 and rotate the stem toward the front deck section 113 in cooperation with a force exerted on the neck hinge 121 by the neck spring 123, thereby drawing the handlebars toward the rear wheelset 142. Once the neck hinge 121 closes to a target angle (e.g., less than 45°, or the fully-closed neck hinge position), the latch release system 150 can automatically release the deck hinge 111 from the open deck position, thereby enabling the deck hinge spring to preload the deck hinge 111, lift the deck hinge 111 above the ground below, and draw the rear wheelset 142 toward the front wheelset 141 as the user lifts the stem 130 and handlebars 131 back toward a vertical orientation. As the stem nears or passes through the vertical orientation: the neck hinge 121 can enter the fully-closed neck hinge 121 position; the rear wheelset 142 can reach a position nearest the front wheelset 141; the deck hinge 111 can enter the fully-closed deck hinge position; and the neck latch 122 and deck latch 112 can latch the neck hinge 121 and the deck hinge 111, respectively, in their closed positions, thereby locking the scooter in the tow mode. Once the scooter enters the tow mode or if the user further manipulates the neck control 151, the latch release system 150 can release the stem latch 132, thereby enabling the user to lower the second stem section 134 into the first stem section 133. Once the second stem section 134 is fully retracted into the first stem section 133, the stem latch 132 can latch the stem in this retracted position, thereby transition the scooter 100 into the stow mode. With the scooter 100 thus in the stow mode, the user may grasp the center handle on the stem to steer the scooter 100 on its three wheels, such as to steer the scooter 100 under a desk in an office space or under a table at home. Alternatively, once the latch release system 150 releases the stem latch 132, the user may grasp the center pull handle, tilt the scooter 100 back on its rear wheelset 142, and tow the scooter behind her with the stem latch 132 still released.

In the above implementation, the neck hinge 121 can include a switch located on a first side of the neck hinge 121 and configured to engage a cable connected to the deck hinge 111 when the neck hinge 121 enters the closed neck position from the open neck position such that deck hinge 111 releases from the open deck hinge position. Additionally, the deck hinge 111 can include a switch located on a first side of the deck hinge 111 and configured to engage a cable connected to the stem latch 131 when the deck hinge 111 enters the closed deck position from the open deck position such that the stem latch releases from the extended stem position.

Figure 10B:
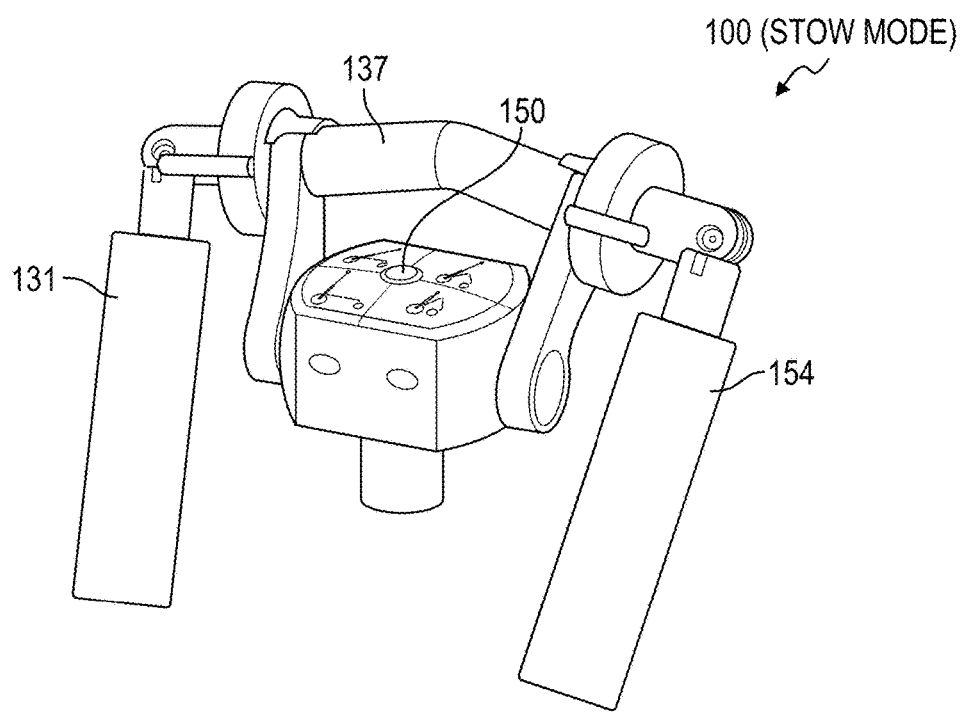

In another implementation shown in FIG. 10B, the scooter includes a multistage control 150 operable in a set of positions including: a first position configured to release the neck hinge 121; a second position configured to release the deck hinge 111; and a third position configured to release the stem latch 132. In this implementation, the multistage control 150 can include: the first position configured to release the neck hinge 121 and advance the multistage control 150 to the second position; the second position configured to release the deck hinge 111 and advance the multistage control 150 to the third position; the third position configured to release the stem latch 132 and advance the multistage control 150 to the fourth position; and a fourth position configured to release the stem latch 132, the neck hinge 121, and the deck hinge 111, and advance the multistage control 150 to the first position. Additionally or alternatively, the multistage control 150 can: include the neck control 151, the deck control 152, and the stem control 153. The multistage control 150 can manually transition between: a default stage to latch the neck hinge 121, the deck hinge 111, and the stem latch 132; a first stage to release the neck hinge 121 with the deck hinge 111 and the stem latch 132 latched, the first position succeeding the default position; a second stage to release the neck hinge 121 and the deck hinge 111 with the stem latch 132 latched, the second position succeeding the first position; and a third stage configured to release the neck hinge 121, the deck hinge 111, and the stem latch 132, the third position succeeding the second position. Thus, the user may transition the scooter 100 from go mode to tow mode to stow mode via a single control, rather than by engaging multiple controls at each mode.

9.7 Alternative Control Actuation

In another implementation, the release system 150 can be coupled to the stem, neck, and/or deck latches via hydraulic or pneumatic pressure lines. In yet another implementation, the scooter 100 includes: an electromechanical actuator arranged adjacent and coupled to the neck latch 122; an input surface (e.g., an electromechanical button, a capacitive touch surface) arranged on the stem (e.g., on or near the center pull handle or coupled to a release system 150); and a controller configured to transmit commands to release the neck latch 122 to the actuator via a wired or wireless connection. In this implementation, the scooter 100 can similarly include electromechanical actuators coupled to the stem latch 132 and/or deck latch 112 and similarly controlled by the same input surface; the controller can then trigger these actuators substantially simultaneously or according to a preset sequence. For example, the controller can trigger the stem actuator to release immediately after depression of the input surface by a user; if the user continues to depress the input surface for more than four seconds, the controller can further trigger the neck and deck actuators to release the neck hinge 121 and deck hinge 111, specifically.

Alternatively, in this implementation, the scooter 100 can include multiple independently-operable input surfaces (e.g., discrete electromechanical buttons), and the controller can selectively trigger corresponding actuators in the scooter 100 to activate responsive to selection of these input surfaces in order to enable the user to independently adjust the stem position and independently transition the scooter 100 between go and tow/stow modes.

In another implementation, the scooter 100 includes: an electronic deck hinge latch (e.g., a solenoid latch) mechanically coupled to the deck hinge 111; and an electronic neck hinge latch mechanically coupled to the neck hinge 121. The neck control 151 can be positioned at the set of handlebars 131, wirelessly coupled to the electronic neck hinge 121 latch, and configured to wirelessly trigger the neck latch 122 to release the neck hinge 121. Similarly, in this implementation, the deck control 152 can be positioned at the set of handlebars 131, wirelessly coupled to the electronic neck hinge 121 latch, and configured to wirelessly trigger the electronic deck hinge 111 latch to release the deck hinge 111. Thus, in this implementation, the scooter 100 can omit mechanical or electrical connections between these hinge latches and hinges and can support remote control of modes occupied by the scooter 100, such as via a companion application executing on a user's mobile device.

In a similar implementation, the scooter 100 includes a deck actuator: interposed between the front deck section 113 and the rear deck section 114; electrically coupled to the deck control 152; and configured to drive a front side surface of the front deck section 113 about the deck hinge 111 and away from a rear side surface of the rear deck section 114 in response to a first input at the deck control 152. In this implementation, the scooter 100 can similarly include a neck actuator: interposed between the neck and the front deck section 113; electrically coupled to the neck control 151; and configured to drive the stem about the neck hinge 121 and toward the front deck surface 118 of the front deck section 113 in response to the first input at the neck control 151. In this implementation, the latch release system 150 can trigger the hinge and neck actuators to automatically transition the scooter 100 between go and tow modes when manually selected by the user (or responsive to an input via a companion application executing on a user's mobile device) without additional manual manipulation by the user.

However, the stem latch 132, neck latch 122, and/or deck latch 112 can each be actuated independently, actuated simultaneously in groups, or actuated automatically in a staged sequence via any other mechanical, hydraulic, wired electromechanical, or wireless electromechanical controls in order to enable rapid transition of the scooter 100 between the go, tow, and stow modes without requiring the user to manipulate the scooter 100 with two hands or to stoop to manipulate the scooter 100.

However, the scooter 100 can include any other remote mode controls configured in any other way.

10. Bag Mount

In one variation shown in FIGS. 1, 2A-2C, 3-4, 6B and 9A-9B, the scooter 100 includes a fixed (or interchangeable, quick release, etc.) bag mount 126 (or "tote hoop"): coupled to the neck 120; offset longitudinally behind the stem 130; extending upwardly from the neck 120 approximately parallel to the axis of the stem; and configured to retain a bag, garment, or other peripheral item carried by a user when the user is riding or towing the scooter 100 or when the scooter 100 is stowed. In particular, the bag mount 126 extends upwardly from the neck and just behind the stem when the scooter 100 is in the go mode and functions to engage and retain a bag, purse, briefcase, or grocery bag—otherwise carried by a user—while the user operates (e.g., "rides") the scooter 100. By thus carrying such an object behind the stem 130 and over the neck 120, the bag mount 126 can reduce physical burden on the user and lower the overall center of gravity of the user and scooter 100, which may improve handling of the scooter 100, improve the user's balance, and yield greater riding comfort for the user. For example, the bag mount 126 can define a steel, aluminum, or polymer hoop approximately four inches wide and extending up to approximately 20 inches above the top of the deck 110 when the scooter 100 is in the go mode.

Furthermore, the bag mount 126 can be fixedly coupled to the upper section of the neck hinge 121 such that the bag mount 126 extends upwardly from the neck hinge 121 and falls between the stem and the top surface of the front deck section 113 when the scooter 100 is in the tow or stow mode, thereby enabling a user to loop a bag, purse, briefcase, or garment over the bag mount 126 even when the scooter 100 is in the tow or stow mode. For example, while the scooter 100 is manually towed in the tow mode by a user, the bag mount 126 can support and retain a bag otherwise carried by the user, thereby enabling the user to roll the scooter 100 and bag in-unit rather than carry the bag separately, thus enabling the user to travel more comfortably with the scooter 100 even when the scooter 100 is not in operation as a powered scooter (e.g., when used as a handcart). In another example, while the scooter 100 is stowed under a desk in the stow mode, the bag mount 126 can support and retain a bag—which may have otherwise occupied this storage location under this desk—such that the scooter 100 reduces the need for additional storage space to store the bag and raises the bag off the floor for more convenient access when the user is sitting or standing.

Figure 6B:
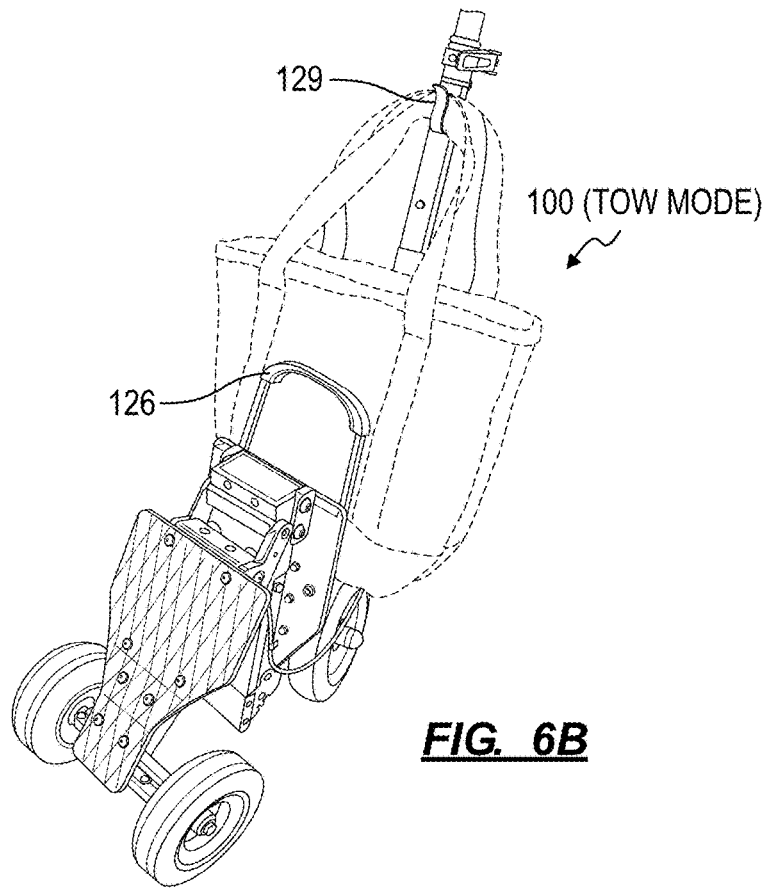

In one implementation, the scooter 100 can include a bag latch 129 (as shown in FIGS. 1 and 6B). The bag latch 129 (or "bag handle clasp accessory") can be transiently mounted to the stem 130 and configured to receive and retain a handle of a bag or tote such that the user can further secure the bag in the bag mount 126. For example, the bag latch 129 and bag mount 126 can cooperate to retain a reusable grocery bag while the user tows the scooter 100—in tow mode—through a grocery store, thus eliminating the need for the user to acquire a shopping cart when entering the store.

10.1 Tote Hoop Receptacle and Alternate Accessories

In one variation, the upper section of the neck hinge 121 defines a bag mount receptacle configured to transiently engage a variety of bag mounts of different geometries configured to retain objects of different shapes and sizes (as shown in FIGS. 2A-2C, 6B, AND 7B). For example, the scooter 100 can be supplied with a kit of different bag mounts, including: a first tall bag mount defining a valet at its distal end and configured to carry an overgarment (e.g., a coat, a suit jacket); a second short and wide bag mount defining multiple hooks configured to support multiple grocery bags over the deck; and a third standard bag mount of moderate height, defining a narrow width, and configured to accept a hand strap at the top of a backpack, purse, or messenger bag.

In this variation, a bag mount 126 can double as a U-lock (or cable lock, etc.), and the bag mount receptacle can transiently support the bag mount via the upper segment of the neck. In particular, when riding the scooter 100 in the go mode, towing the scooter 100 in the tow mode, or storing the scooter 100 in the stow mode, this bag mount can remain in place in the bag mount 126 receptacle and can retain a bag, garment, or other object. However, when the user prepares to leave the scooter 100 unattended in a public space, the user can: remove the bag or garment, etc. from the bag mount; remove the bag mount from the bag mount receptacle; pass an open end of the bag mount around the stem of the scooter 100 and around another fixed object (e.g., a bicycle storage rack); and lock the open ends of the bag mount in order to secure the scooter 100. However, the receptacle is configured to transiently receive a bag mount of any other type or geometry to meet the user's baggage and security needs.

In another implementation, the bag mount can be: intransiently connected; pivotably coupled to the upper section of the neck 120 hinge; and include a distal end configured to support a bag or garment, etc. and operable between an open/unlocked state and a closed/locked state. Thus, to secure the scooter 100 in a public space, a user can: unlock the distal end of the bag mount, which can release a latch and enable the bag mount to pivot relative to the upper section of the neck 120 hinge; pivot the bag mount from the anteroposterior axis of the scooter 100 to engage a fixed object nearby; weave the open, distal end of the bag mount around this fixed object; and then lock the distal end of the bag mount to secure the scooter 100 to this fixed object.

Furthermore, the bag mount 126 can function as a robust grab handle that falls near longitudinal and lateral centers of gravity of the scooter 100 when in the tow and stow modes; a user may thus grasp the top of the bag mount 126 to lift the scooter 100, such as to lift the scooter 100 into a storage cubby (as shown in FIG. 5A) or to move the scooter 100 up or down a staircase or step (as shown in FIG. 3).

As a person skilled in the art will recognize from the previous detailed description and from the figures and claims, modifications and changes can be made to the embodiments of the invention without departing from the scope of this invention as defined in the following claims.

We claim:

1. A scooter comprising:
   a deck comprising:
     a front deck segment defining a front deck surface;
     a rear deck segment defining a rear deck surface;
     a deck hinge interposed between the front deck segment and the rear deck segment;
   a neck hinge coupled to the front deck segment opposite the deck hinge;
   a neck coupled to the neck hinge opposite the front deck segment;
   a stem rotatably coupled to the neck;
   a set of handlebars coupled to a first end of the stem;
   a front wheelset coupled to a second end of the stem opposite the set of handlebars;
   a rear wheelset coupled to the rear deck segment opposite the deck hinge;
   a neck control configured to release the neck hinge for transition between an open neck position and a closed neck position;
   a deck control configured to release the deck hinge for transition of the deck between an open deck position and a closed deck position;
   a deck spring coupled to the front deck segment and the rear deck segment and configured to bias the deck hinge from the open deck position toward the closed deck position in response to the deck control releasing the deck hinge from the open deck position; and
   a neck spring coupled to the neck and the front deck segment and configured to bias the neck hinge from the open neck position toward the closed neck position in response to the neck control releasing the neck hinge from the open neck position;
   wherein the deck hinge occupies the open deck position and the neck hinge occupies the open neck position in a first mode of the scooter for riding by a user; and
   wherein the deck hinge occupies the closed deck position and the neck hinge occupies the closed neck position in a second mode of the scooter for towing by the user.

2. The scooter of claim 1:
   wherein the front deck surface and the rear deck surface define a deck angle between 170° and 190° when the deck hinge occupies the open deck position;
   wherein the front deck surface and the rear deck surface define the deck angle between −15° and +15° when the deck hinge occupies the closed deck position;
   wherein the front deck surface and the stem define a neck angle between 80° and 100° when the neck hinge occupies the open neck position; and
   wherein the front deck surface and the stem define the neck angle between −15° and +15° when the neck hinge occupies the closed neck position.

3. The scooter system of claim 1:
   wherein the deck hinge locates the front deck surface tangent the rear deck surface to form a substantially continuous deck surface in the open deck position;
   wherein the deck hinge separates the front deck section from the second deck section with the deck hinge located above the rear truck in the closed deck position;
   wherein the neck hinge locates the stem at a first angular offset from the front deck section in the open neck position; and
   wherein the neck hinge locates the stem proximal and at a second angular offset from the front deck section in the closed neck position, the second angular offset less than the first angular offset.

4. The scooter system of claim 1:
   wherein the stem comprises:
     a first stem section coupled to the front wheelset and pivotably coupled to the neck hinge;
     a second stem section coupled to the set of handlebars and configured to locate the set of handlebars at a first distance from the front wheelset in an extended stem position and to locate the set of handlebars at a second distance from the front wheelset in a retracted stem position, the second distance less than the first distance; and
     a stem latch configured to transiently retain the second stem section in the extended stem position and the retracted stem position relative to the first stem section;
   wherein, in the first mode, the deck hinge occupies the open deck position, the neck hinge occupies the open neck position, and the second stem section occupies the extended position; and
   wherein, in the second mode, the deck hinge occupies the closed deck position, the neck hinge occupies the closed neck position, and the second stem section occupies the retracted position.

5. The scooter system of claim 4, further comprising a multistage control:
   comprising the neck control, the deck control, and a stem control; and manually actuatable between:
- a default stage to latch the neck hinge, the deck hinge, and the stem latch;
- a first stage to release the neck hinge and to latch the deck hinge and the stem latch, the first stage succeeding the default stage;
- a second stage to release the neck hinge and the deck hinge and to latch the stem latch, the second stage succeeding the first stage; and
- a third stage configured to release the neck hinge, the deck hinge, and the stem latch, the third stage succeeding the second stage.

6. The scooter system of claim 4:
wherein, in the second mode:
- the deck hinge and the neck hinge cooperate to locate a frontmost point of the front wheelset within 22" of a rearmost point of the rear wheelset; and
- the deck hinge, the neck hinge, and the stem latch cooperate to locate a topmost point of the set of handlebars within 24" of a bottommost point of the set of front wheels; and
wherein the rear wheel comprises a left rear wheel and a right rear wheel, a first outermost point of the left rear wheel within 12" of a second outermost point of the right rear wheel.

7. The scooter system of claim 1, further comprising a bag mount:
- coupled to the neck;
- extending proximal and offset from the stem;
- interposed between the stem and the front deck section;
- configured to locate a tote between the stem and the front deck section when the scooter occupies the second mode; and
- configured to locate the tote between the stem and the user when the scooter occupies the first mode.

8. The scooter system of claim 7:
further comprising an accessory receptacle coupled to the neck;
wherein the bag mount is configured to removably couple to the accessory receptacle and is transiently located proximal and offset from the stem by the accessory receptacle; and
further comprising a scooter lock configured to removably couple to the accessory receptacle.

9. The scooter system of claim 1:
wherein the rear wheelset comprises:
- a rear truck comprising a four-bar linkage and coupled to the rear deck segment opposite the deck hinge;
- a first rear wheel rotatably coupled to a first side of the four-bar linkage;
- a second rear wheel rotatably coupled to the four-bar linkage opposite the first rear wheel; and
wherein the stem comprises a fork opposite the set of handlebars; and
wherein the front wheelset comprises a front wheel rotatably coupled to the fork.

10. The scooter system of claim 1:
further comprising:
- an electronic neck hinge latch configured to mechanically latch the neck hinge in the open neck position;
- an electronic deck hinge latch configured to mechanically latch the deck hinge in the open deck position; and
wherein the neck control is coupled to the stem proximal the set of handlebars and is configured to trigger the electronic neck hinge latch to unlatch the neck hinge in response to manual selection; and wherein the deck control is coupled to the stem proximal the neck control and is configured to trigger the electronic deck hinge latch to unlatch the deck hinge in response to manual selection.

11. The scooter system of claim 1, wherein the deck control is configured to release the deck hinge for transition of the deck from the open deck position to the closed deck position in response to the neck hinge entering the closed neck position from the open neck position.

12. The scooter system of claim 1, wherein the set of handlebars comprises:
- a pair of lateral handlebars operable in an extended position for riding of the scooter by the user and in a collapsed position for stowing of the scooter; and
- a fixed handle coaxial with the stem, interposed between the pair of lateral handlebars, and graspable for towing of the scooter by the user.

13. The scooter system of claim 1, further comprising:
- a motor coupled to the front wheelset;
- a throttle coupled to the set of handlebars; and
- a first rechargeable battery located within the front deck segment and configured to supply power to the motor according to a position of the throttle.

14. A scooter comprising:
a deck comprising:
- a front deck segment defining a front deck surface;
- a rear deck segment defining a rear deck surface;
- a deck hinge interposed between the front deck segment and the rear deck segment;
a neck hinge coupled to the front deck segment opposite the deck hinge;
a neck coupled to the neck hinge opposite the front deck segment;
a stem rotatably coupled to the neck;
a set of handlebars coupled to a first end of the stem;
a front wheelset coupled to a second end of the stem opposite the set of handlebars;
a rear wheelset coupled to the rear deck segment opposite the deck hinge;
a neck control configured to release the neck hinge for transition between an open neck position and a closed neck position;
a deck control configured to release the deck hinge for transition of the deck between an open deck position and a closed deck position; and
a bag mount:
- coupled to the neck;
- extending proximal and offset from the stem;
- interposed between the stem and the front deck section;
- configured to locate a tote between the stem and the front deck section when the scooter occupies a second mode; and
- configured to locate the tote between the stem and the user when the scooter occupies a first mode;
wherein the deck hinge occupies the open deck position and the neck hinge occupies the open neck position in the first mode of the scooter for riding by a user; and
wherein the deck hinge occupies the closed deck position and the neck hinge occupies the closed neck position in the second mode of the scooter for towing by the user.

15. The scooter system of claim 14, further comprising:
- a deck spring coupled to the front deck segment and the rear deck segment and configured to bias the deck hinge from the open deck position toward the closed deck position in response to the deck control releasing the deck hinge from the open deck position; and a neck spring coupled to the neck and the front deck segment and configured to bias the neck hinge from the open neck position toward the closed neck position in response to the neck control releasing the neck hinge from the open neck position.

16. A scooter comprising:
a deck comprising:
   a front deck segment defining a front deck surface;
   a rear deck segment defining a rear deck surface;
   a deck hinge interposed between the front deck segment and the rear deck segment;
a neck hinge coupled to the front deck segment opposite the deck hinge;
a neck coupled to the neck hinge opposite the front deck segment;
a stem rotatably coupled to the neck and comprising:
   a first stem section coupled to the front wheelset and pivotably coupled to the neck hinge;
   a second stem section coupled to the set of handlebars and configured to locate the set of handlebars at a first distance from the front wheelset in an extended stem position and to locate the set of handlebars at a second distance from the front wheelset in a retracted stem position, the second distance less than the first distance; and
   a stem latch configured to transiently retain the second stem section in the extended stem position and the retracted stem position relative to the first stem section;
a set of handlebars coupled to a first end of the stem;
a front wheelset coupled to a second end of the stem opposite the set of handlebars;
a rear wheelset coupled to the rear deck segment opposite the deck hinge;
a neck control configured to release the neck hinge for transition between an open neck position and a closed neck position;
a deck control configured to release the deck hinge for transition of the deck between an open deck position and a closed deck position;
a multistage control:
   comprising the neck control, the deck control, and a stem control; and
   manually actuatable between:
      a default stage to latch the neck hinge, the deck hinge, and the stem latch;
      a first stage to release the neck hinge and to latch the deck hinge and the stem latch, the first stage succeeding the default stage;
      a second stage to release the neck hinge and the deck hinge and to latch the stem latch, the second stage succeeding the first stage; and
      a third stage configured to release the neck hinge, the deck hinge, and the stem latch, the third stage succeeding the second stage;
wherein the deck hinge occupies the open deck position, the second stem section occupies the extended position, and the neck hinge occupies the open neck position in a first mode of the scooter for riding by a user; and
wherein the deck hinge occupies the closed deck position, the second stem section occupies the retracted position, and the neck hinge occupies the closed neck position in a second mode of the scooter for towing by the user.

* * * * *